(12) United States Patent
Jeon et al.

(10) Patent No.: US 12,143,147 B2
(45) Date of Patent: Nov. 12, 2024

(54) ELECTRONIC DEVICE FOR TRANSMITTING UPLINK SIGNAL AND METHOD FOR OPERATING THE SAME

(71) Applicant: Samsung Electronics Co., Ltd., Gyeonggi-do (KR)

(72) Inventors: Minhwan Jeon, Gyeonggi-do (KR); Honggyu Kim, Gyeonggi-do (KR); Hongseok Kim, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 387 days.

(21) Appl. No.: 17/730,329

(22) Filed: Apr. 27, 2022

(65) Prior Publication Data
US 2022/0352619 A1   Nov. 3, 2022

Related U.S. Application Data

(63) Continuation of application No. PCT/KR2022/005693, filed on Apr. 21, 2022.

(30) Foreign Application Priority Data

Apr. 29, 2021   (KR) .................. 10-2021-0055545

(51) Int. Cl.
*H04B 1/59*   (2006.01)
*H04B 1/00*   (2006.01)
*H04B 1/04*   (2006.01)

(52) U.S. Cl.
CPC .............. *H04B 1/59* (2013.01); *H04B 1/006* (2013.01); *H04B 1/04* (2013.01); *H04B 2001/0408* (2013.01)

(58) Field of Classification Search
CPC . H04B 1/59; H04B 1/006; H04B 1/04; H04B 2001/0408

(Continued)

(56) References Cited

U.S. PATENT DOCUMENTS 5,748,682 A * 5/1998 Mobin .................... H04L 27/22
                                                      329/304
6,230,026 B1 * 5/2001 Schwaller ............ H04B 1/7136
                                                      375/138

(Continued)

FOREIGN PATENT DOCUMENTS

KR   10-1992-0704467 A    12/1992
KR   10-2020-0018734 A     2/2020
WO        2017/040142 A1   3/2017

OTHER PUBLICATIONS

International search report dated Jul. 27, 2022.

*Primary Examiner* — April G Gonzales
(74) *Attorney, Agent, or Firm* — Cha & Reiter, LLC

(57) ABSTRACT

According to various embodiment, an electronic device may include at least one communication processor, an RFIC, a power amplifier, and at least one modulator configured to provide the power amplifier with a supply voltage set for a first unit of time in a first mode or in a second unit of time shorter than the first unit of time in a second mode. The at least one communication processor may be configured to control the at least one modulator to provide the supply voltage according to the second mode and to switch from the second mode to the first mode when a variation in a voltage associated with a first element for providing the supply voltage is greater than or equal to a threshold magnitude while the supply voltage is provided to the power amplifier according to the second mode. Other various embodiments are possible as well.

20 Claims, 14 Drawing Sheets

(58) Field of Classification Search
USPC .................................................. 455/127.1
See application file for complete search history.

(56) References Cited

U.S. PATENT DOCUMENTS

| | | | | |
|---|---|---|---|---|
| 6,744,832 | B2* | 6/2004 | Miao | H04B 1/7163 |
| | | | | 455/12.1 |
| 8,195,103 | B2* | 6/2012 | Waheed | H03F 1/3241 |
| | | | | 455/114.3 |
| 2007/0049311 | A1* | 3/2007 | Lindoff | H04W 88/02 |
| | | | | 455/515 |
| 2009/0034449 | A1* | 2/2009 | Kong | H04W 52/386 |
| | | | | 370/320 |
| 2009/0034502 | A1* | 2/2009 | Kostic | H04W 52/241 |
| | | | | 370/342 |
| 2009/0075612 | A1* | 3/2009 | Keehr | H04B 1/123 |
| | | | | 455/226.1 |
| 2013/0238913 | A1* | 9/2013 | Huang | H04W 52/028 |
| | | | | 713/310 |
| 2014/0060911 | A1* | 3/2014 | Slagle | H05K 3/30 |
| | | | | 29/832 |
| 2014/0111178 | A1* | 4/2014 | Khlat | H03F 1/0211 |
| | | | | 323/293 |
| 2015/0289138 | A1* | 10/2015 | Wang | H04W 12/08 |
| | | | | 455/411 |
| 2017/0310338 | A1* | 10/2017 | Hori | H03M 3/39 |
| 2018/0278437 | A1* | 9/2018 | Davydov | H04B 7/0617 |
| 2018/0337637 | A1* | 11/2018 | Galal | H03F 1/0233 |
| 2019/0082412 | A1* | 3/2019 | Zander | H04W 56/0035 |
| 2019/0090218 | A1* | 3/2019 | Noh | H04W 72/51 |
| 2019/0158206 | A1* | 5/2019 | Li | H04J 13/0048 |
| 2020/0052654 | A1* | 2/2020 | McGowan | H03F 3/45475 |
| 2020/0169436 | A1* | 5/2020 | Kim | H04L 27/368 |
| 2020/0287577 | A1* | 9/2020 | Hitomi | H04B 1/0458 |
| 2020/0322042 | A1* | 10/2020 | Rainish | H04B 7/18515 |

* cited by examiner

ELECTRONIC DEVICE FOR TRANSMITTING UPLINK SIGNAL AND METHOD FOR OPERATING THE SAME

CROSS-REFERENCE TO RELATED APPLICATION(S)

This application is a Continuation of and claims priority under 35 U.S.C. § 120 to PCT International Application No. PCT/KR2022/005693, which was filed on Apr. 21, 2022, and claims priority to Korean Patent Application No. 10-2021-0055545, filed on Apr. 29, 2021, in the Korean Intellectual Property Office, the disclosure of which are incorporated by reference herein their entirety.

BACKGROUND

Technical Field

The disclosure relates to an electronic device transmitting an uplink signal and a method for operating the same.

Description of Related Art

An electronic device may transmit a plurality of types of uplink signals. For example, physical channels for uplink signals may include at least one of physical uplink shared channel (PUSCH), physical uplink control channel (PUCCH), physical random access channel (PRACH), or sounding reference signal (SRS), etc. The electronic device may transmit each of the uplink signals—the PUSCH, the uplink signal of the PUCCH, the uplink signal of the PRACH, and the SRS—using resources allocated for each uplink channel.

Meanwhile, the transmission power for each uplink physical channel may be different. Accordingly, as RF signals corresponding to each of the uplink physical channels are separately transmitted, the transmission power of the RF signal may be changed. The electronic device may include at least one power amplifier for amplifying RF signals. Modes for controlling the supply voltage Vcc applied to the power amplifier based on the transmission power of the RF signal include envelope tracking (ET) mode and average power tracking (APT) mode. In the APT mode, the supply voltage may be controlled based on the transmission power of the RF signal, and the supply voltage may be controlled in units of time of slots (or subframes). Meanwhile, in the ET mode, the supply voltage may be controlled by tracking the transmission power of the RF signal in real time.

SUMMARY

A difference in transmission power between each of the uplink signals may be set to be relatively large. In this case, the supply voltage Vcc provided to the power amplifier for amplifying the RF signal may be changed with a relatively large difference when in the ET mode. To provide the vastly different supply voltage Vcc, relatively rapid charge and discharge may occur in the capacitor corresponding to the modulator for providing the supply voltage. Relatively rapid charge and discharge at the capacitor may cause electrical noise in a speaker (or a receiver) in the electronic device.

According to various embodiment, an electronic device may comprise at least one communication processor configured to output at least one baseband signal associated with each of at least one physical channel, an RFIC configured to output at least one RF signal generated based on the at least one baseband signal, a power amplifier configured to amplify and output the at least one RF signal, and at least one modulator configured to provide the power amplifier with a supply voltage set for a first unit of time in a first mode or provide the power amplifier with the supply voltage set in a second unit of time shorter than the first unit of time in a second mode. The at least one communication processor may be configured to control the at least one modulator to provide the supply voltage to the power amplifier according to the second mode and control the at least one modulator to switch from the second mode to the first mode when a variation in a voltage associated with a first element for providing the supply voltage is greater than or equal to a threshold magnitude or the voltage associated with the first element exceeds a first threshold voltage or is less than a second threshold voltage while the supply voltage is provided to the power amplifier according to the second mode.

A method for operating an electronic device including at least one communication processor configured to output at least one baseband signal associated with each of at least one physical channel, an RFIC configured to output at least one RF signal generated based on the at least one baseband signal, a power amplifier configured to amplify and output the at least one RF signal, and at least one modulator configured to provide the power amplifier with a supply voltage set for a first unit of time in a first mode or provide the power amplifier with the supply voltage set in a second unit of time shorter than the first unit of time in a second mode may comprise controlling, by the at least one communication processor, the at least one modulator to provide the supply voltage to the power amplifier according to the second mode and controlling, by the at least one communication processor, the at least one modulator to switch from the second mode to the first mode when a variation in a voltage associated with a first element for providing the supply voltage is greater than or equal to a threshold magnitude or the voltage associated with the first element exceeds a first threshold voltage or is less than a second threshold voltage while the supply voltage is provided to the power amplifier according to the second mode.

According to various embodiment, an electronic device may comprise at least one communication processor configured to output at least one baseband signal associated with each of at least one physical channel, an RFIC configured to output at least one RF signal generated based on the at least one baseband signal, a power amplifier configured to amplify and output the at least one RF signal, and at least one modulator configured to provide the power amplifier with a supply voltage set for a first unit of time in a first mode or provide the power amplifier with the supply voltage set in a second unit of time shorter than the first unit of time in a second mode. The at least one communication processor may be configured to identify, at at least one first time, that a variation in a voltage associated with a first element for providing the supply voltage is greater than or equal to a threshold magnitude or the voltage associated with the first element exceeds a first threshold voltage or is less than a second threshold voltage while the supply voltage is provided to the power amplifier according to the second mode, identify at least one second time corresponding to each of the at least one physical channel set by a network, control the at least one modulator to provide the power amplifier with the supply voltage set according to the first mode to amplify an RF signal of a physical channel corresponding to at least one of the at least one second time, based on at least one of the at least one first time corresponding to the at least one of the at least one second time, and control the at least one modulator to keep on providing the supply voltage according to the second mode, based on absence of a time interval corresponding to the first time intervals among time intervals between the plurality of second times.

Additional aspects will be set forth in part in the description which follows and, in part, will be apparent from the description, or may be learned by practice of the presented embodiments.

According to various embodiments of the disclosure, there may be provided an electronic device and a method for operating the same, which may switch the mode for a specific physical channel set by a network from the ET mode to the APT mode when the interval between times when a change, by a threshold magnitude or more, in the voltage associated with an element for supply voltage of the power amplifier in the ET mode is detected corresponds to the interval between times corresponding to the specific physical channel. In the APT mode, a chance of relatively abrupt charge and discharge at the capacitor decreases, and so does the likelihood of electrical noise at the speaker.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

According to certain embodiments of the disclosure, in an electronic device and a method for operating the same, it is possible to switch the mode for a specific physical channel set by a network from the ET mode to the APT mode when the interval between times when a change, by a threshold magnitude or greater, in the voltage associated with an element for supply voltage of the power amplifier in the ET mode is detected corresponds to the interval between times corresponding to the specific physical channel.

In the APT mode, the chances of relatively abrupt charge and discharge at the capacitor (the element for supply voltage of the power amplifier) decreases, and so does the likelihood of electrical noise at the speaker.

Figure 1:
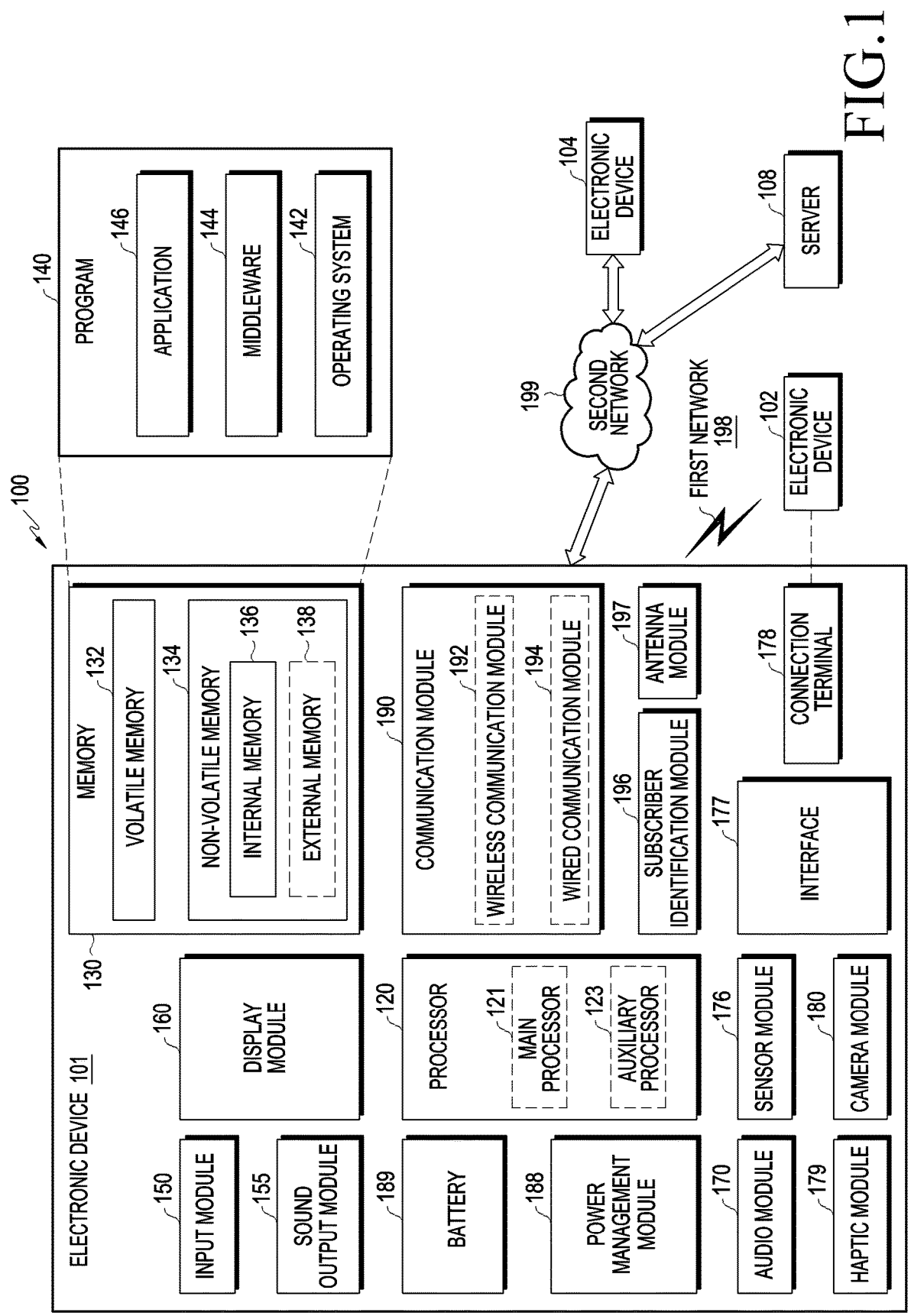
FIG. 1 is a block diagram illustrating an electronic device in a network environment according to various embodiment.

FIG. 1 is a block diagram illustrating an electronic device 101 in a network environment 100 according to various embodiment. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to various embodiment, the electronic device 101 may communicate with the electronic device 104 via the server 108. According to various embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one (e.g., the connecting terminal 178) of the components may be omitted from the electronic device 101, or one or more other components may be added in the electronic device 101. According to various embodiment, some (e.g., the sensor module 176, the camera module 180, or the antenna module 197) of the components may be integrated into a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to various embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be configured to use lower power than the main processor 121 or to be specified for a designated function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to various embodiment, the auxiliary processor 123 (e.g., an image signal processor or a communication processor) may be implemented as part of another component (e.g., the camera module 180 or the communication module 190) functionally related to the auxiliary processor 123. According to various embodiment, the auxiliary processor 123 (e.g., the neural processing unit) may include a hardware structure specified for artificial intelligence model processing. The artificial intelligence model may be generated via machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by other component (e.g., the processor 120) of the electronic device 101, from the outside (e.g., a user) of the electronic device 101. The input module 150 may include, for example, a microphone, a mouse, a keyboard, keys (e.g., buttons), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to various embodiment, the receiver may be implemented as separate from, or as part of the speaker.

The display module 160 may visually provide information to the outside (e.g., a user) of the electronic device 101. The display 160 may include, for example, a display, a hologram device, or a projector and control circuitry to control a corresponding one of the display, hologram device, and projector. According to various embodiment, the display 160 may include a touch sensor configured to detect a touch, or a pressure sensor configured to measure the intensity of a force generated by the touch.

The audio module 170 may convert a sound into an electrical signal and vice versa. According to various embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to various embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to various embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to various embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or motion) or electrical stimulus which may be recognized by a user via his tactile sensation or kinesthetic sensation. According to various embodiment, the haptic module 179 may include, for example, a motor, a piezoelectric element, or an electric stimulator.

The camera module 180 may capture a still image or moving images. According to various embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to various embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to various embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via a first network 198 (e.g., a short-range communication network, such as Bluetooth™, wireless-fidelity (Wi-Fi) direct, or infrared data association (IrDA)) or a second network 199 (e.g., a long-range communication network, such as a legacy cellular network, a 5G network, a next-generation communication network, the Internet, or a computer network (e.g., local area network (LAN) or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to various embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device). According to various embodiment, the antenna module 197 may include one antenna including a radiator formed of a conductor or conductive pattern formed on a substrate (e.g., a printed circuit board (PCB)). According to various embodiment, the antenna module 197 may include a plurality of antennas (e.g., an antenna array). In this case, at least one antenna appropriate for a communication scheme used in a communication network, such as the first network 198 or the second network 199, may be selected from the plurality of antennas by, e.g., the communication module 190. The signal or the power may then be transmitted or received between the communication module 190 and the external electronic device via the selected at least one antenna. According to various embodiment, other parts (e.g., radio frequency integrated circuit (RFIC)) than the radiator may be further formed as part of the antenna module 197.

According to various embodiments, the antenna module 197 may form a mmWave antenna module. According to various embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to various embodiment, commands or data may be transmitted or received between the electronic device 101 and the external electronic device 104 via the server 108 coupled with the second network 199. The external electronic devices 102 or 104 each may be a device of the same or a different type from the electronic device 101. According to various embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to various embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2A:
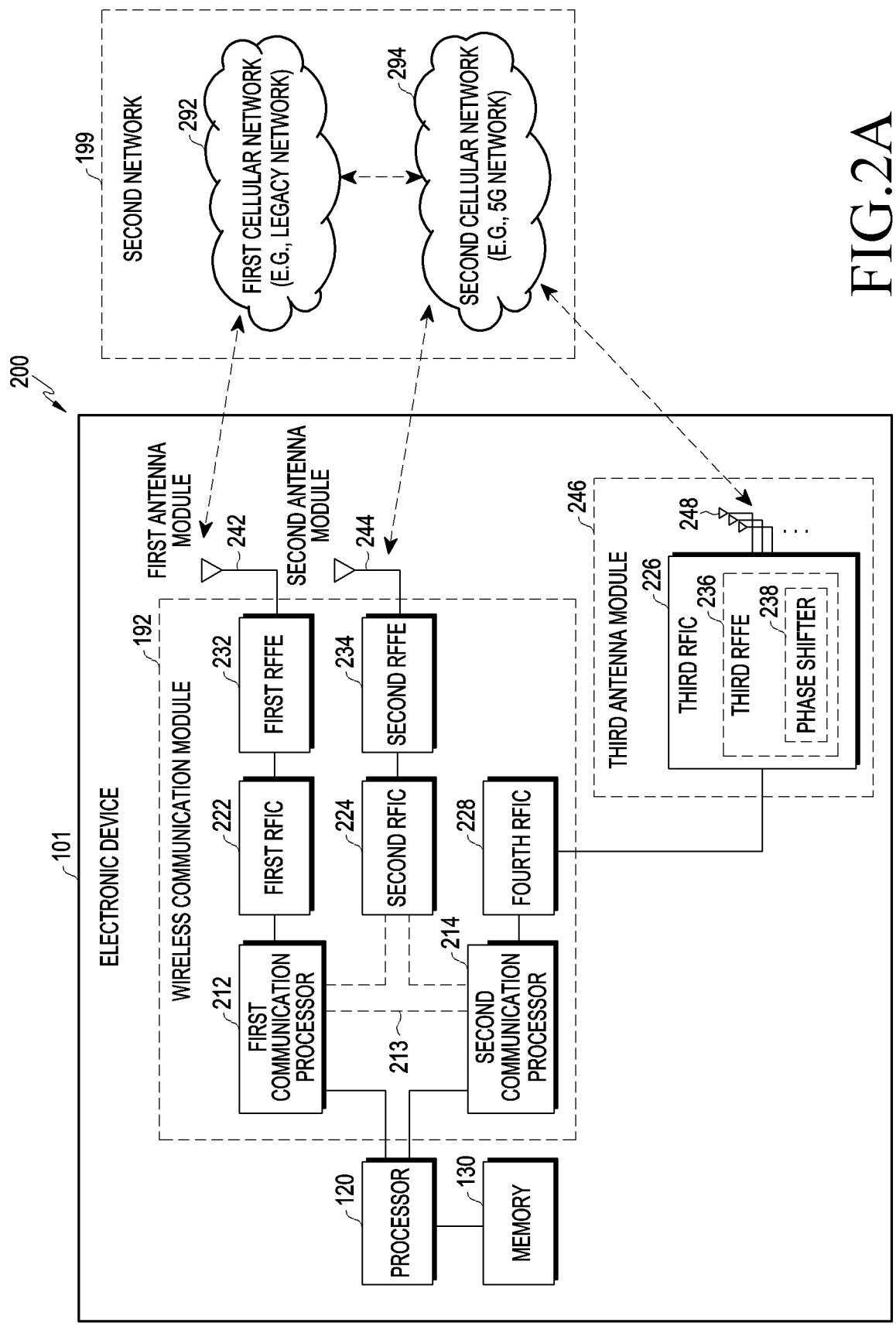
FIG. 2A is a block diagram illustrating an electronic device for supporting legacy network communication and 5G network communication according to various embodiment.

FIG. 2A is a block diagram 200 illustrating an electronic device 101 for supporting legacy network communication and 5G network communication according to various embodiment. Referring to FIG. 2A, the electronic device 101 may include a first communication processor 212, a second communication processor 214, a first radio frequency integrated circuit (RFIC) 222, a second RFIC 224, a third RFIC 226, a fourth RFIC 228, a first radio frequency front end (RFFE) 232, a second RFFE 234, a first antenna module 242, a second antenna module 244, a third antenna module 246, and antennas 248. The electronic device 101 may further include a processor 120 and a memory 130. The second network 199 may include a first cellular network 292 and a second cellular network 294. According to another embodiment, the electronic device 101 may further include at least one component among the components of FIG. 1, and the second network 199 may further include at least one other network. According to various embodiment, the first communication processor 212, the second communication processor 214, the first RFIC 222, the second RFIC 224, the fourth RFIC 228, the first RFFE 232, and the second RFFE 234 may form at least part of the wireless communication module 192. According to another embodiment, the fourth RFIC 228 may be omitted or be included as part of the third RFIC 226. The processors 212 and 214 may include a microprocessor or any suitable type of processing circuitry, such as one or more general-purpose processors (e.g., ARM-based processors), a Digital Signal Processor (DSP), a Programmable Logic Device (PLD), an Application-Specific Integrated Circuit (ASIC), a Field-Programmable Gate Array (FPGA), a Graphical Processing Unit (GPU), a video card controller, etc. In addition, it would be recognized that when a general purpose computer accesses code for implementing the processing shown herein, the execution of the code transforms the general purpose computer into a special purpose computer for executing the processing shown herein. Certain of the functions and steps provided in the Figures may be implemented in hardware, software or a combination of both and may be performed in whole or in part within the programmed instructions of a computer. No claim element herein is to be construed under the provisions of 35 U.S.C. 112(f), unless the element is expressly recited using the phrase "means for." In addition, an artisan understands and appreciates that a "processor" or "microprocessor" may be hardware in the claimed disclosure. Under the broadest reasonable interpretation, the appended claims are statutory subject matter.

The first communication processor 212 may establish a communication channel in a band that is to be used for wireless communication with the first cellular network 292 or may support legacy network communication via the established communication channel. According to various embodiments, the first cellular network may be a legacy network that includes second generation (2G), third generation (3G), fourth generation (4G), or long-term evolution (LTE) networks. The second CP 214 may establish a communication channel corresponding to a designated band (e.g., from about 6 GHz to about 60 GHz) in the bands that are to be used for wireless communication with the second cellular network 294 or may support fifth generation (5G) network communication via the established communication channel. According to various embodiment, the second cellular network 294 may be a 5G network defined by the 3rd generation partnership project (3GPP). Additionally, according to various embodiment, the first CP 212 or the second CP 214 may establish a communication channel corresponding to another designated band (e.g., about 6 GHz or less) in the bands that are to be used for wireless communication with the second cellular network 294 or may support fifth generation (5G) network communication via the established communication channel.

The first communication processor 212 may perform data transmission/reception with the second communication processor 214. For example, data classified as transmitted via the second cellular network 294 may be changed to be transmitted via the first cellular network 292. In this case, the first communication processor 212 may receive transmission data from the second communication processor 214. For example, the first communication processor 212 may transmit/receive data to/from the second communication processor 214 via an inter-processor interface 213. The inter-processor interface 213 may be implemented as, e.g., universal asynchronous receiver/transmitter (UART) (e.g., high speed-UART (HS-UART)) or peripheral component interconnect bus express (PCIe) interface, but the instant disclosure is not so limited. The first communication processor 212 and the second communication processor 214 may exchange packet data information and control information using, e.g., a shared memory. The first communication processor 212 may transmit/receive various pieces of information, such as sensing information, output strength information, or resource block (RB) allocation information, to/from the second communication processor 214.

According to implementation, the first communication processor 212 may not be directly connected with the second communication processor 214. In this case, the first communication processor 212 may transmit/receive data to/from the second communication processor 214 via a processor 120 (e.g., an application processor). For example, the first communication processor 212 and the second communication processor 214 may transmit/receive data to/from the processor 120 (e.g., an application processor) via an HS-UART interface or PCIe interface, but the kind of the interface is not limited thereto. The first communication processor 212 and the second communication processor 214 may exchange control information and packet data information with the processor 120 (e.g., an application processor) using a shared memory.

Figure 2B:
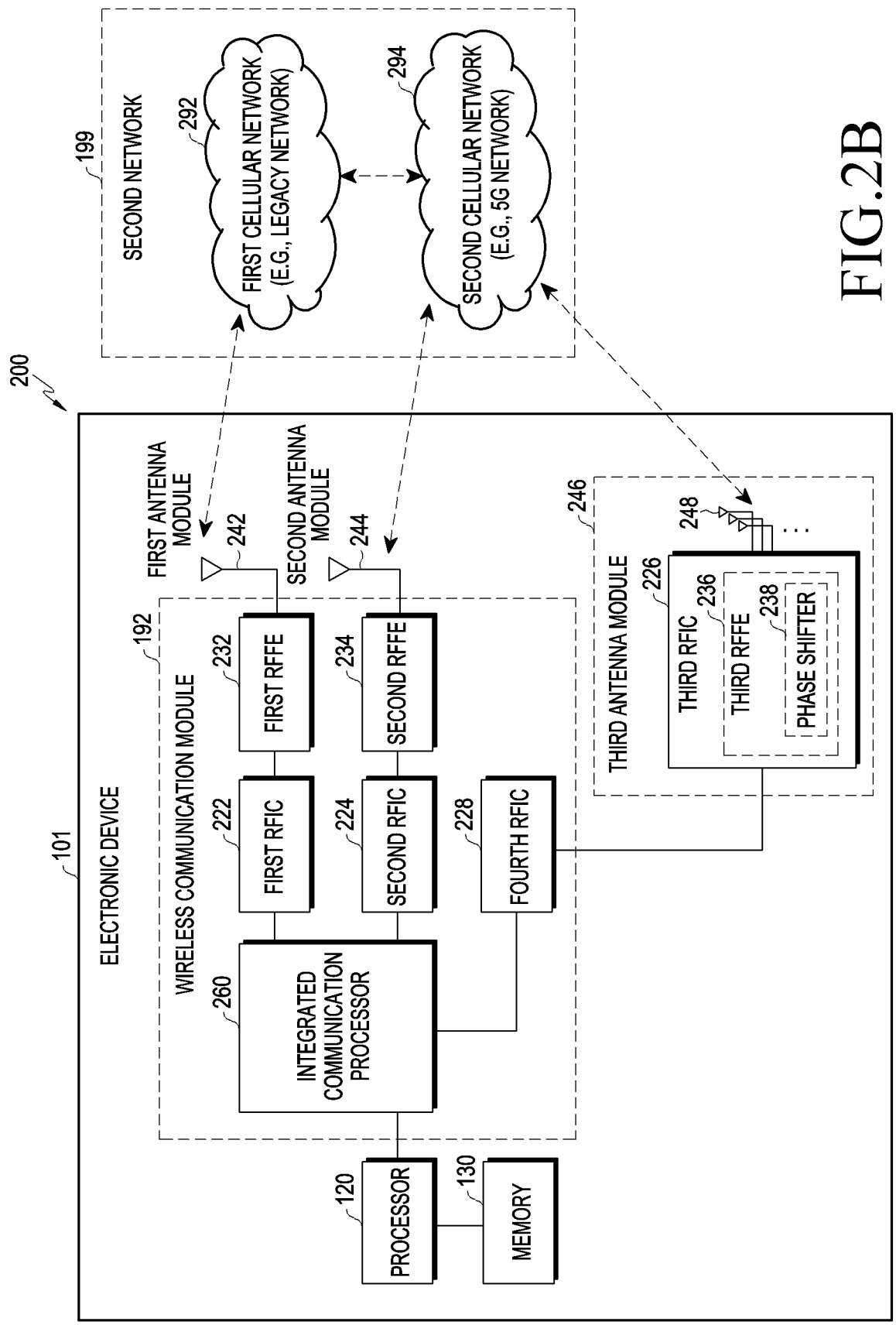
FIG. 2B is a block diagram illustrating an electronic device for supporting legacy network communication and 5G network communication according to another embodiment.

According to various embodiment, the first communication processor 212 and the second communication processor 214 may be implemented in a single chip or a single package. According to various embodiment, the first communication processor 212 or the second communication processor 214, along with the processor 120, an assistance processor 123, or communication module 190, may be formed in a single chip or single package. For example, as shown in FIG. 2B, an integrated communication processor 260 may support all of the functions for communication with the first cellular network 292 and the second cellular network 294.

Upon transmission, the first RFIC 222 may convert a baseband signal generated by the first communication processor 212 into a radio frequency (RF) signal with frequency ranging from about 700 MHz to about 3 GHz which is used by the first cellular network 292 (e.g., legacy network). Upon receipt, the RF signal may be obtained from the first network 292 (e.g., legacy network) through an antenna (e.g., the first antenna module 242) and be pre-processed via an RFFE (e.g., the first RFFE 232). The first RFIC 222 may convert the pre-processed RF signal into a baseband signal that may be processed by the first communication processor 212.

Upon transmission, the second RFIC 224 may convert the baseband signal generated by the first communication processor 212 or the second communication processor 214 into a Sub6-band (e.g., about 6 GHz or less) RF signal (hereinafter, "5G Sub6 RF signal") that is used by the second cellular network 294 (e.g., 5G network). Upon receipt, the 5G Sub6 RF signal may be obtained from the second cellular network 294 (e.g., 5G network) through an antenna (e.g., the second antenna module 244) and be pre-processed via an RFFE (e.g., the second RFFE 234). The second RFIC 224 may convert the pre-processed 5G Sub6 RF signal into a baseband signal that may be processed by a corresponding processor of the first communication processor 212 and the second communication processor 214.

The third RFIC 226 may convert the baseband signal generated by the second communication processor 214 into a 5G Above6 band (e.g., about 6 GHz to about 60 GHz) RF signal (hereinafter, "5G Above6 RF signal") that is to be used by the second cellular network 294 (e.g., 5G network).

Upon receipt, the 5G Above6 RF signal may be obtained from the second cellular network 294 (e.g., 5G network) through an antenna (e.g., the antenna 248) and be pre-processed via the third RFFE 236. The third RFIC 226 may convert the pre-processed 5G Above6 RF signal into a baseband signal that may be processed by the second communication processor 214. According to various embodiment, the third RFFE 236 may be formed as part of the third RFIC 226.

According to various embodiment, the electronic device 101 may include the fourth RFIC 228 separately from, or as at least part of, the third RFIC 226. In this case, the fourth RFIC 228 may convert the baseband signal generated by the second communication processor 214 into an intermediate frequency band (e.g., from about 9 GHz to about 11 GHz) RF signal (hereinafter, "IF signal") and transfer the IF signal to the third RFIC 226. The third RFIC 226 may convert the IF signal into a 5G Above6 RF signal. Upon receipt, the 5G Above6 RF signal may be received from the second cellular network 294 (e.g., 5G network) through an antenna (e.g., the antenna 248) and be converted into an IF signal by the third RFIC 226. The fourth RFIC 228 may convert the IF signal into a baseband signal that may be processed by the second communication processor 214.

According to various embodiment, the first RFIC 222 and the second RFIC 224 may be implemented as at least part of a single chip or single package. According to various embodiments, when the first RFIC 222 and the second RFIC 224 in FIG. 2A or 2B are implemented as a single chip or a single package, they may be implemented as an integrated RFIC. In this case, the integrated RFIC is connected to the first RFFE 232 and the second RFFE 234 to convert baseband signals into signals of a band supported by the first RFFE 232 and/or the second RFFE 234, and may transmit the converted signals to one of the first RFFE 232 and the second RFFE 234. According to various embodiment, the first RFFE 232 and the second RFFE 234 may be implemented as at least part of a single chip or single package. According to various embodiment, at least one of the first antenna module 242 or the second antenna module 244 may be omitted or be combined with another antenna module to process multi-band RF signals.

According to various embodiment, the third RFIC 226 and the antenna 248 may be disposed on the same substrate to form the third antenna module 246. For example, the wireless communication module 192 or the processor 120 may be disposed on a first substrate (e.g., main painted circuit board (PCB)). In this case, the third RFIC 226 and the antenna 248, respectively, may be disposed on one area (e.g., the bottom) and another (e.g., the top) of a second substrate (e.g., sub PCB) which is provided separately from the first substrate, forming the third antenna module 246. Placing the third RFIC 226 and the antenna 248 on the same substrate may shorten the length of the transmission line therebetween. This may reduce a loss (e.g., attenuation) of high-frequency band (e.g., from about 6 GHz to about 60 GHz) signal used for 5G network communication due to the transmission line. Thus, the electronic device 101 may enhance the communication quality with the second network 294 (e.g., a 5G network).

According to various embodiment, the antenna 248 may be implemented as an antenna array which includes a plurality of antenna elements available for beamforming. In this case, the third RFIC 226 may include a plurality of phase shifters 238 corresponding to the plurality of antenna elements, as part of the third RFFE 236. Upon transmission, the plurality of phase shifters 238 may change the phase of the 5G Above6 RF signal which is to be transmitted to the outside (e.g., a 5G network base station) of the electronic device 101 via their respective corresponding antenna elements. Upon receipt, the plurality of phase shifters 238 may change the phase of the 5G Above6 RF signal received from the outside to the same or substantially the same phase via their respective corresponding antenna elements. This enables transmission or reception via beamforming between the electronic device 101 and the outside.

The second cellular network 294 (e.g., 5G network) may be operated independently (e.g., as standalone (SA)) from, or in connection (e.g., as non-standalone (NSA)) with the first cellular network 292 (e.g., legacy network). For example, the 5G network may include access networks (e.g., 5G access networks (RANs)) but lack any core network (e.g., a next-generation core (NGC)). In this case, the electronic device 101, after accessing the 5G network access network, may access an external network (e.g., the Internet) under the control of the core network (e.g., the evolved packet core (EPC)) of the legacy network. Protocol information (e.g., LTE protocol information) for communication with the legacy network or protocol information (e.g., New Radio (NR) protocol information) for communication with the 5G network may be stored in the memory 230 and be accessed by other components (e.g., the processor 120, the first communication processor 212, or the second communication processor 214).

Figure 3:
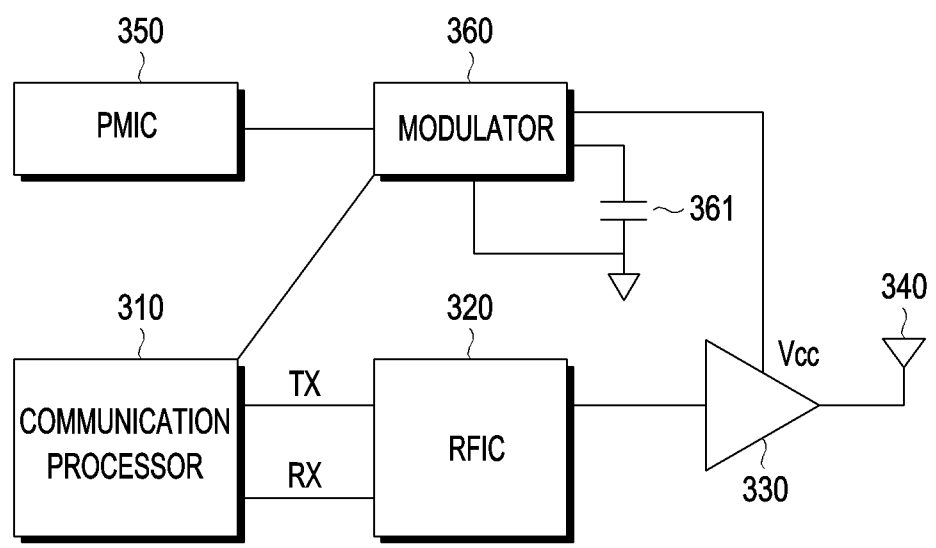
FIG. 3 is a block diagram illustrating an electronic device including a power amplifier according to various embodiment.
Figure 4A:
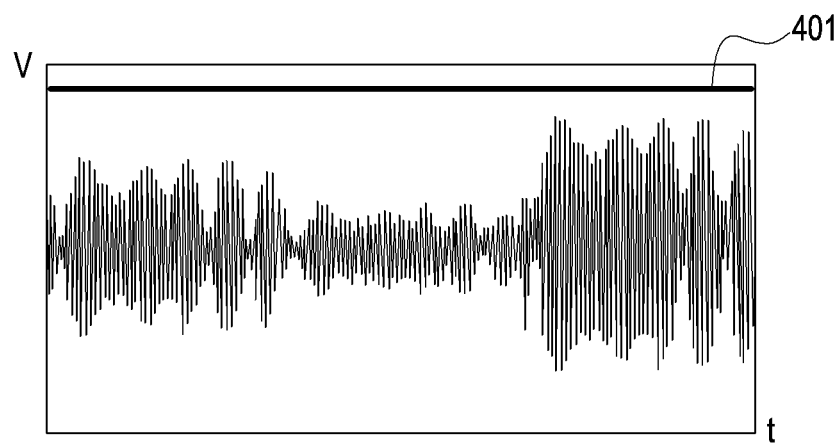
FIGS. 4A to 4C are views illustrating operation modes of a modulator according to various embodiment.
Figure 4B:
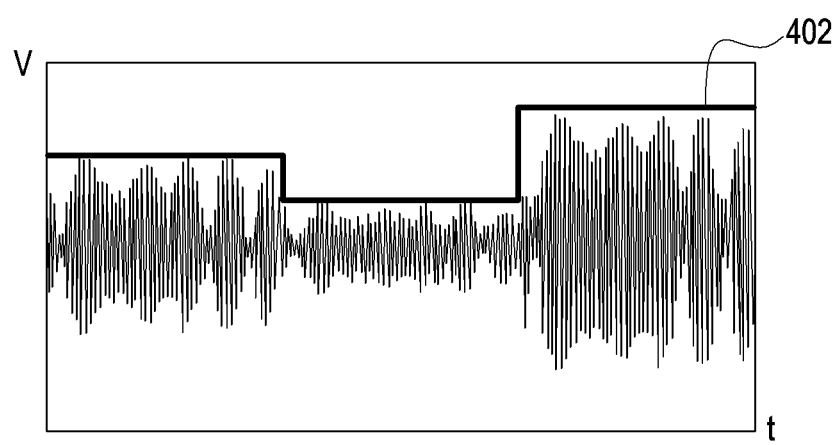
Figure 4C:
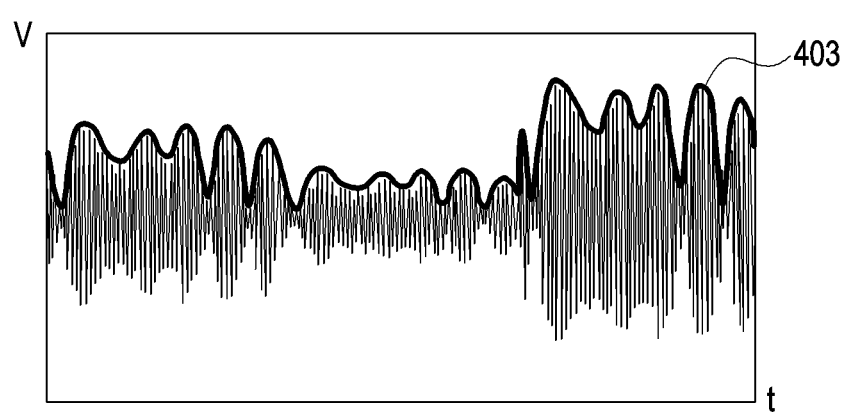

FIG. 3 is a block diagram illustrating an electronic device including a power amplifier according to various embodiment. The embodiment related to FIG. 3 is described in greater detail with reference to FIGS. 4A to 4C. FIGS. 4A to 4C are views illustrating operation modes of a modulator according to various embodiment.

According to various embodiment, an electronic device 101 may include at least one of a communication processor 310, an RFIC 320, a power amplifier 330, an antenna 340, a power management integrated circuit (PMIC) 350, a modulator 360, a capacitor 361.

According to various embodiment, the communication processor 310 (e.g., at least one of the first communication processor 212, the second communication processor 214, or the integrated communication processor 260) may provide a baseband signal TX for transmission to the RFIC 320 (e.g., at least one of the first RFIC 222, the second RFIC 224, the third RFIC 226, or the fourth RFIC 228). Alternatively, the communication processor 310 may receive and process a baseband signal RX for reception from the RFIC 320.

According to various embodiment, the RFIC 320 may generate, e.g., an RF signal corresponding to the baseband signal TX for transmission and provide it to the power amplifier 330. In FIG. 3, the baseband signal TX for transmission is illustrated as being provided to the RFIC 320 via a single wire, but this is exemplary. It will be appreciated by one of ordinary skill in the art that a baseband signal having an in-phase (I) component and a quadrature (Q) component may be provided to the RFIC 320. The power amplifier 330 may be included in an RFFE (e.g., at least one of the first RFFE 232, the second RFFE 234, or the third RFFE 236). The RFFE may be implemented as a power amplifier module (PAM), front end module (FEM), power amplifier module including duplexer (PAMiD), LNA and PAM with integrated duplexer or diplexer (LPAMID), or PA with integrated low noise amplifier and filter (LPAMIF), etc. In FIG. 3, the power amplifier 330 is illustrated as being connected to the RFIC 320, but it will be appreciated by one of ordinary skill in the art that the RFFE may be implemented to include a filter and/or an antenna switching module (ASM) in addition to the power amplifier 330. Meanwhile, in FIG. 3, one RFIC 320, one power amplifier 330, and one antenna 340 are illustrated as being included in the electronic device 101, but it will be appreciated by one of ordinary skill in the art that this is for convenience of description, and the electronic device 101 may be implemented to include multiple RFICs, power amplifiers, and antennas.

According to various embodiment, the PMIC 350 may supply power to the modulator 360. The modulator 360 may provide a supply voltage Vcc to the power amplifier 330 based on the received power. The power amplifier 330 may amplify the RF signal provided from the RFIC 320 using the supply voltage Vcc. The modulator 360 may operate according to any one of the APT mode, the ET mode, and the direct mode. In various embodiments, the APT mode, the ET mode, and the direct mode may be referred to as the first mode, the second mode, and the third mode, respectively.

In one example, when operating according to the direct mode, the supply voltage (Vcc) 401 of the power amplifier 330 may be set to be a designated value as shown in FIG. 4A. In the direct mode, the supply voltage of the designated value 401 may be provided to the power amplifier 330 irrespective of the magnitude of transmission power for each signal. In this case, wasted power consumption may be relatively large. In another example, when operating according to the APT mode, the supply voltage (Vcc) 402 of the power amplifier 330 may be set (or changed) according to the designated units of time (e.g., slots or subframes) as shown in FIG. 4B. For example, in a subframe (or slot) in which the transmission power of the RF signal is set to 10 to 18 dBm, a supply voltage Vcc of 3V may be supplied to the power amplifier 330, but in a subframe (or slot) in which the transmission power of the RF signal is set to 18 to 24 dBm, a supply voltage (Vcc) of 4V may be supplied to the power amplifier 330. In another example, when operating according to the ET mode, the supply voltage (Vcc) 403 of the power amplifier 330 may be set (or changed) in real time according to the magnitude of the transmission power of the RF signal as shown in FIG. 4C. When operating according to the ET mode, the modulator 360 may track the transmission power of the RF signal in real time, providing a supply voltage corresponding to the envelope of the transmission power to the power amplifier 330. The time interval for setting (or changing) the supply voltage Vcc in the ET mode may be shorter than the time interval for setting (or changing) the supply voltage Vcc in the APT mode. The modulator 360 may determine the magnitude of the supply voltage set in the APT mode or the ET mode using information (e.g., the value ($\sqrt{i^2+Q^2}$) based on the I/Q signal of the baseband signal or the RF signal) from the communication processor 310. Although not shown, the modulator 360 may include at least one of an envelope detector, an envelope shaper, or an amplifier, but is not limited thereto. The modulator 360 may be implemented as a portion of the PMIC 350, as a portion of the RFFE, or as a portion of the RFIC 320 or may be implemented as hardware independent of other components, but is not limited to the specific implementations disclosed herein. Meanwhile, in FIG. 3, the modulator 360 is illustrated as supporting both the APT mode and the ET mode, but this is exemplary. According to various embodiment, the electronic device 101 may include one modulator for the APT mode and another modulator for the ET mode.

According to various embodiment, a capacitor 361 may be connected to the modulator 360. For example, the modulator 360 may include a power amplifier (e.g., Class AB amplifier) (not shown) that is an element for providing the supply voltage in the ET mode. The power amplifier for providing the supply voltage may be referred to as, e.g., a driving amplifier. In the ET mode, for the driving amplifier of the modulator 360 to provide the power amplifier 330 with the supply voltage Vcc according to the value ($\sqrt{i^2+Q^2}$) based on the I/Q signal of the baseband signal, the capacitor 361 may be charged or discharged. The capacitor 361 may be connected to the driving amplifier (not shown). For example, the supply voltage Vcc from the driving amplifier (not shown) of the modulator 360 may be provided to the power amplifier 330, and the supply voltage Vcc may be determined according to the value ($\sqrt{i^2+Q^2}$) based on the I/Q signal of the baseband signal. The modulator 360 may control the amount of charge and/or the amount of discharge of the capacitor 361 to supply the determined supply voltage Vcc.

According to various embodiment, the electronic device 101 may transmit uplink signals of various physical channels. The transmission power for each physical channel may be different. In one example, the transmission power of PUCCH of E-UTRA for subframe (i) may be set according to Equation (1).

$$P_{PUCCH}(i)=\min\{P_{CMAX}, P_{O\_PUCCH}+PL+h(n_{CQI}, n_{HARQ})+\Delta_{F\_PUCCH}(F)+g(i)\}dBm \qquad \text{[Equation 1]}$$

$P_{CMAX}$ is the maximum output power according to the power class of the electronic device 101. $P_{O\_PUSCH}$ is the sum of $P_{O\_NOMINAL\_PUSCH}$ (the parameter specified by the cell) and $P_{O\_UE\_PUSCH}$ (the parameter specified by the electronic device 101). PL is the downlink path-loss measured by the electronic device 101. $h(n_{CQI}, n_{HARQ})$ is the value according to the PUCCH format, $n_{CQI}$ is the amount of information according to the channel quality indicator (CQI), and $n_{HARQ}$ is the number of hybrid automatic repeat request (HARQ) bits. $\Delta_{F\_PUCCH}(F)$ is the value for PUCCH transport format F and is given to the electronic device 101 by RRC. g(i) is the value that may be adjusted by the downlink control information (DCI) from the base station. At least some of the parameters for Equation 1 may follow, e.g., 3GPP TS 36.213. The electronic device 101 may set the smaller of $P_c$ and the sum of $P_{O\_UE\_PUCCH}$, PL, $h(n_{CQI}, n_{HARQ})$, $\Delta_{F\_PUCCH}(F)$, and g(i), as the transmission power of PUCCH of LTE. Meanwhile, the transmission power of PUSCH, the transmission power of SRS, and the transmission power of PRACH may also be set according to 3GPP TS 36.213 in the case of E-UTRA or 3GPP TS 38.213 in the case of NR, but this is merely exemplary. The electronic device 101 may support RATs of E-UTRA and/or NR, and it will be understood by one of ordinary skill in the art that various embodiments of the disclosure are not limited by the type of RAT. Meanwhile, the electronic device 101 may perform additional back-off on the transmission power determined as described above based on, e.g., an SAR event.

According to various embodiment, the modulator 360 may provide a supply voltage Vcc to the power amplifier 330 for transmission of the uplink signal. According to various embodiment, the supply voltage Vcc may be determined for transmission of an uplink signal for each physical channel. The transmission power for each physical channel may be different, and peak-to-average power ratio (PAPR) may also differ. For example, in one subframe (or slot), the transmission power of the PUSCH may be set to a first value, the transmission power of PUCCH may be set to a second value, and the transmission power of SRS may be set to a third value. In this case, the third value, which is the transmission power of SRS, may be larger than the first value, which is the transmission power of PUSCH. For example, when the modulator 360 operates in the ET mode, the modulator 360 may provide the power amplifier 330 with a supply voltage Vcc corresponding to the first value, which is the transmission power of PUCCH, to transmit the uplink signal of PUSCH and provide the power amplifier 330 with a supply voltage Vcc corresponding to the third value, which is the transmission power of SRS, to transmit the uplink signal of SRS. When the variation in voltage of the first value or third value is relatively large (e.g., when the peak-to-average power ratio (PAPR) corresponding to each PUSCH and SRS is relatively large), relatively abrupt charge and/or discharge may occur at the capacitor 361. Or, when the difference between the first value and the third value is relatively large (e.g., when the difference between the supply average voltage value of the first value and the third average voltage value is relatively large), relatively abrupt charge and/or discharge may occur at the capacitor 361. Meanwhile, the SRS may be set to be transmitted periodically. Accordingly, relatively abrupt charges and/or discharges may repeatedly occur at the capacitor 361. The repetition of relatively abrupt charges and discharges at the capacitor 361 may cause electrical noise (or current or sound noise). For example, the speaker and/or receiver of the sound output module 155 of the electronic device 101 may output noise due to repetition of relatively abrupt charges and discharges at the capacitor 361. If the user makes a call using the electronic device 101, the user may hear the noise.

According to various embodiment, the electronic device 101 (e.g., the communication processor 310) may identify, at a plurality of times, a change by a threshold magnitude or greater, in the voltage associated with a first element (e.g., the capacitor 361 and/or the driving amplifier included in the modulator 360) for providing the supply voltage Vcc. The sensor for sensing voltage may be included in at least one of, e.g., the communication processor 310, the RFIC 320, or the modulator 360 or may be included, as independent hardware, in the electronic device 101. The communication processor 310 may obtain the magnitude of voltage using the included sensor or from another component including the sensor.

According to various embodiment, when the transmission power of SRS is relatively smaller than the transmission power of other physical channels, the communication processor 310 may identify an abrupt change in voltage, e.g., a change (e.g., drop) by a threshold magnitude or greater, at the time of transmission of the SRS. Since the SRS is periodically transmitted, the communication processor 310 may periodically identify that the variation in voltage greater than the threshold. When the variation in voltage is greater than or equal to the threshold, the communication processor 310 may control the modulator 360, which previously was operating in the ET mode, to operate in the APT mode. Alternatively, when the variation in voltage periodically is greater than or equal to the threshold, the communication processor 310 may control the modulator 360, which previously was operating in the ET mode, to operate in the APT mode if the detected period in which the variation in voltage is greater than the threshold corresponds to a period set by the network. Alternatively, when a change in voltage by the threshold magnitude or greater is identified, or the voltage exceeds a first designated value or is less than or equal to a second designated value, the communication processor 310 may control the modulator 360, which previously was operating in the ET mode, to operate in the APT mode.

According to various embodiment, the communication processor 310 may identify the time interval between multiple times when a change in voltage, by the threshold magnitude or greater, is identified. The communication processor 310 may identify the time interval for each physical channel set by the network. That the identified time interval between multiple times corresponds to the time interval for a specific physical channel set by the network, may mean that the change in voltage, by the threshold magnitude or greater, is attributed to or caused by the transmission of the uplink signal of the specific physical channel. When the identified time interval between multiple times corresponds to the time interval of the specific physical channel set by the network, the communication processor 310 may control the modulator 360, which was previously operating in the ET mode, to operate in the APT mode. As the modulator 360 operates in the APT mode, the uplink signal of the specific physical channel, e.g., the supply voltage Vcc in the slot (or subframe) where the SRS is included, may be set to a predetermined value as shown in FIG. 4B. Thus, abrupt charge and/or discharge does not occur at the capacitor 361, and electrical noise may be suppressed.

Figure 5:
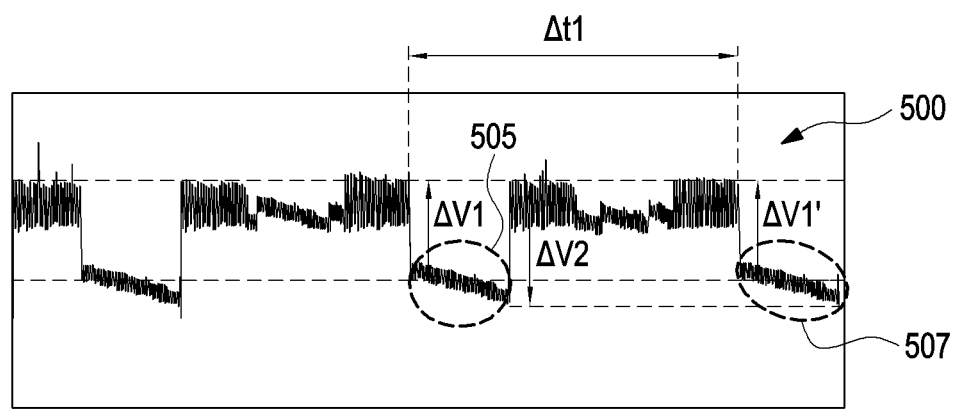
FIG. 5 is a waveform of a voltage generated (or measured) in an electronic device according to various embodiment.

FIG. 5 is a waveform of a voltage generated (or measured) in an electronic device according to various embodiment.

FIG. 5 illustrates a voltage 500 associated with a first element (e.g., the capacitor 361 and/or the driving amplifier included in the modulator 360) for providing the supply voltage Vcc. For example, the electronic device 101 may detect a drop $\Delta V1$ of the voltage 500 and may identify a drop $\Delta V1'$ of the voltage 500 after $\Delta t1$. $\Delta V1'$ may be the same as or different from $\Delta V1$. For example, the electronic device 101 may identify the time interval $\Delta t2$ between SRS transmission times set by the network (not shown). The electronic device 101 may identify that $\Delta V1$, which is the variation in the voltage 500, is equal to or larger than a threshold magnitude. The electronic device 101 may identify that the time interval of the variation in the voltage 500 larger than or equal to the threshold magnitude is $\Delta t1$. The electronic device 101 may identify that $\Delta t2$, which is the time interval between transmission times of the SRS, corresponds to $\Delta t1$. Here, whether $\Delta t2$ corresponds to $\Delta t1$ may mean whether they are the same interval considering tolerances (give or take a certain amount of error).

According to various embodiment, when either a voltage drop by a threshold magnitude or greater or a voltage rise by a threshold magnitude or greater occurs, the electronic device 101 may switch the operation mode of the modulator 360 from the ET mode to the APT mode. In various embodiment, the electronic device 101 may switch the operation mode of the modulator 360 for SRS from the ET mode to the APT mode. Alternatively, the electronic device 101 may switch the operation mode of the modulator 360 in all slots from the ET mode to the APT mode or the direct mode.

In various embodiment, after the transmission of SRS, further discharge may continue at the capacitor 361. Thereafter, the capacitor 361 may be rapidly charged to transmit an uplink signal of another physical channel. Accordingly, a rise in the voltage 500 by $\Delta V2$ may be identified. According to various embodiment, the electronic device may identify either a voltage drop by a threshold magnitude or greater or a voltage rise by a threshold magnitude or greater, as the change in voltage by the threshold magnitude or greater. Meanwhile, in another example, continuous voltage drops 505 and 507 may occur from the transmission timing of the SRS, and the electronic device 101 may identify the voltage drops 505 and 507 as voltage variations larger than or equal to the threshold magnitude.

Alternatively, when the voltage 500 exceeds a first threshold voltage or is less than a second threshold voltage, the electronic device 101 may switch the operation mode of the modulator 360 from the ET mode to the APT mode or direct mode. For example, when a voltage 500 exceeding the first threshold voltage is detected, there is a high chance that a relatively large voltage drop will occur thereafter, and accordingly, current noise may be highly likely to occur. Alternatively, when the voltage 500 less than the second threshold voltage is detected, there is a high chance that a relatively large voltage rise will occur thereafter, and accordingly, current noise may be highly likely to occur. Alternatively, when the voltage 500 exceeds the first threshold voltage or is less than the second threshold voltage, the electronic device 101 may switch the operation mode of the modulator 360 from the ET mode to the APT mode or direct mode, thereby reducing the chances of current noise occurrence. The first threshold voltage and the second threshold voltage may be set to, e.g., values at which chances of occurrence of audible-level current noise is larger than or equal to a predetermined probability, but are not limited thereto.

Figure 6A:
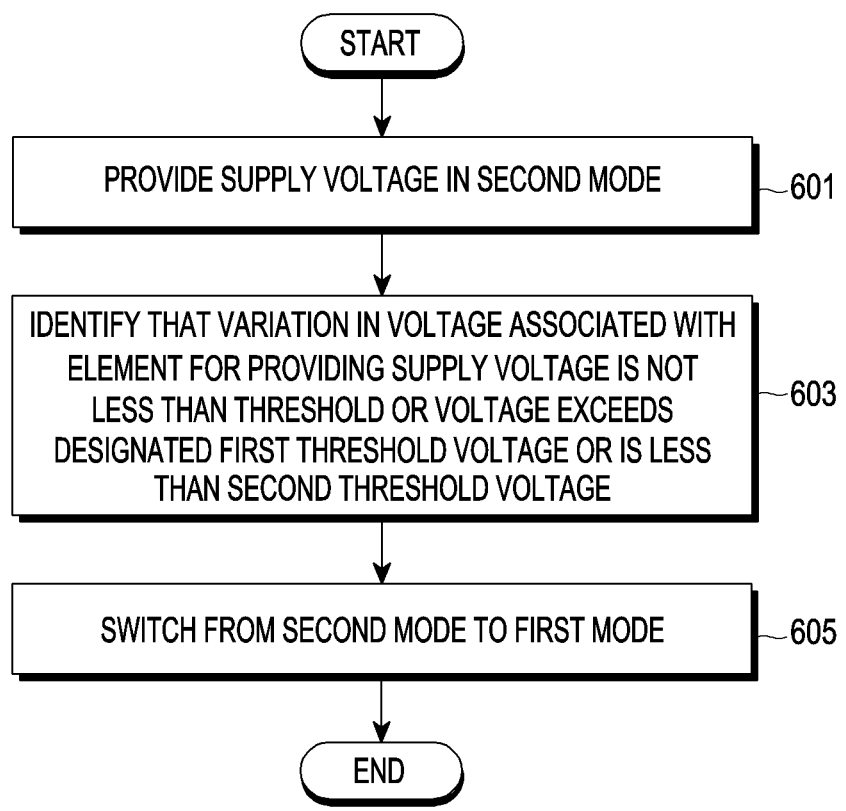
FIG. 6A is a flowchart illustrating an operation method of an electronic device according to various embodiment.

FIG. 6A is a flowchart illustrating an operation method of an electronic device according to various embodiment.

According to various embodiment, the electronic device 101 (e.g., at least one of the processor 120, the first communication processor 212, the second communication processor 214, the integrated communication processor 260, or the communication processor 310) may control the modulator 360 to provide a supply voltage to the power amplifier 330 according to the second mode (e.g., the ET mode) in operation 601. In operation 603, the electronic device 101 may identify that the variation in voltage associated with an element (e.g., the capacitor 361 and/or the driving amplifier included in the modulator 360) for providing the supply voltage is not less than a threshold magnitude or the voltage associated with the element exceeds a designated first threshold voltage or less than a second threshold voltage while the modulator 360 provides the supply voltage to the power amplifier 330 according to the second mode (e.g., the ET mode). In operation 605, based on identifying that the variation in voltage is not less than the threshold magnitude or the voltage associated with the element exceeds the designated first threshold voltage or less than the second threshold voltage, the electronic device 101 may control the modulator 360 to switch the operation mode from the second mode (e.g., the ET mode) to the first mode (e.g., the APT mode) and provide the supply voltage Vcc.

As described above, when the variation in voltage associated with the element (e.g., the capacitor 361 and/or the driving amplifier included in the modulator 360) for providing the supply voltage is less than the threshold magnitude, the chances of current noise occurrence may be high. Alternatively, when the voltage associated with the element (e.g., the capacitor 361 and/or the driving amplifier included in the modulator 360) for providing the supply voltage exceeds a specific value (e.g., the first threshold voltage) or is less than another specific value (e.g., the second threshold voltage), the chances of current noise occurrence may be high. In the situation where the chances of current noise occurrence is high, it is possible to reduce the chances of current noise occurrence by controlling to switch the operation mode of the modulator 360 from the second mode (e.g., the ET mode) to the first mode (e.g., the APT mode) (or direct mode).

Figure 6B:
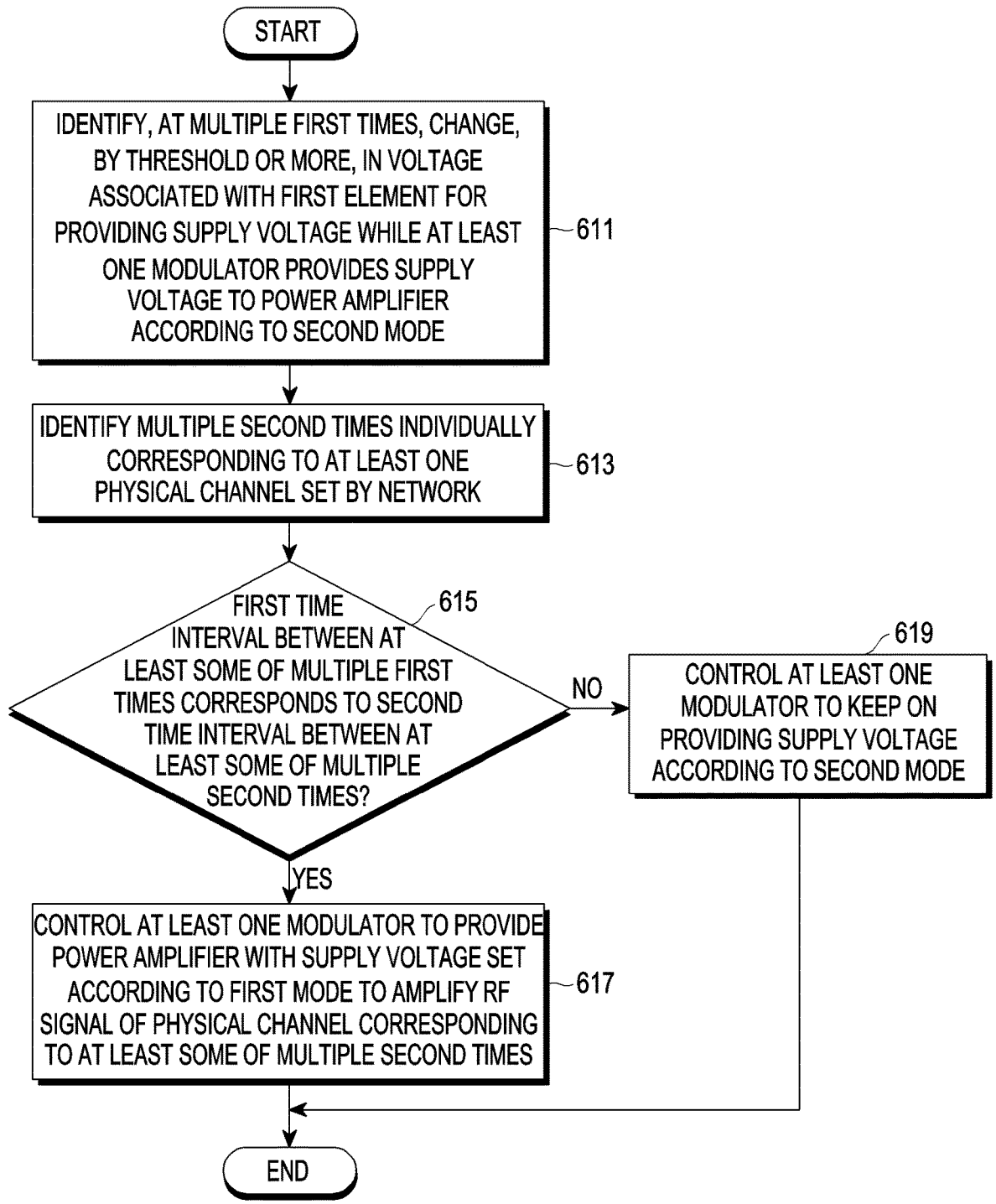
FIG. 6B is a flowchart illustrating an operation method of an electronic device according to various embodiment.
Figure 6C:
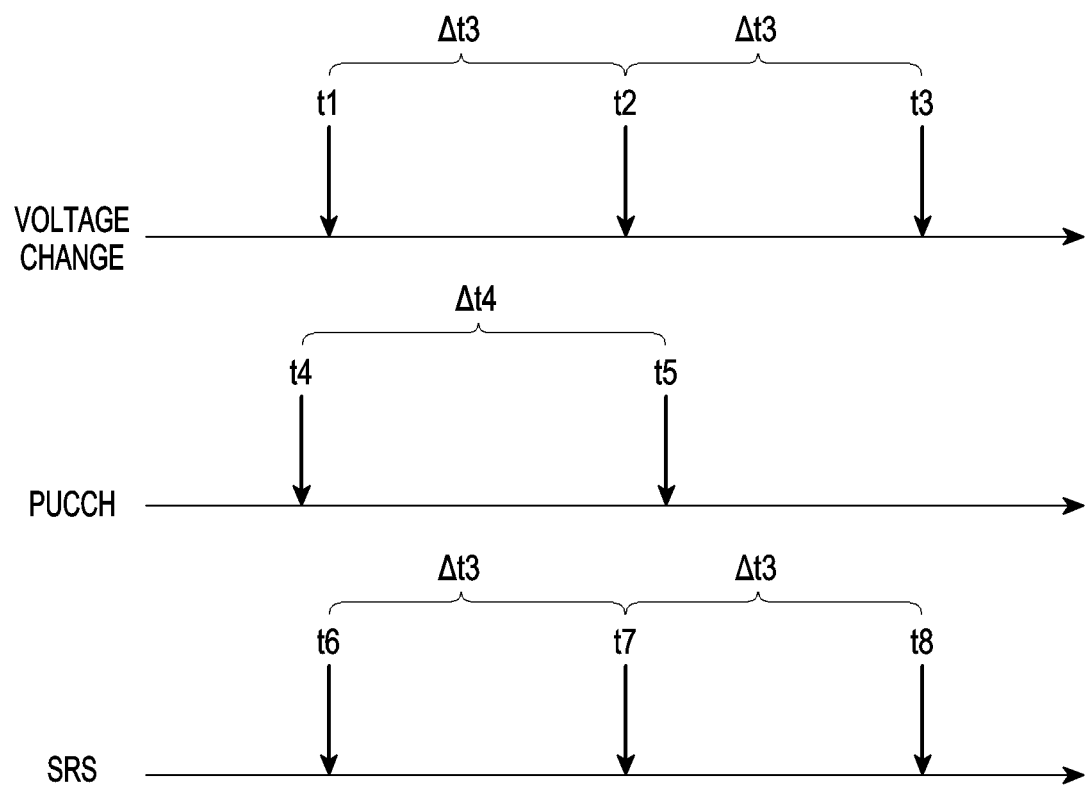
FIG. 6C is a view illustrating an allocation time for each physical channel set by a network and a change in a measured voltage.

FIG. 6B is a flowchart illustrating an operation method of an electronic device according to various embodiment. The embodiment of FIG. 6B is described with reference to FIG. 6C. FIG. 6C is a view illustrating an allocation time for each physical channel set by a network and a change in a measured voltage.

According to various embodiment, the electronic device 101 (e.g., at least one of the processor 120, the first communication processor 212, the second communication processor 214, the integrated communication processor 260, or the communication processor 310) may identify a change, by a threshold magnitude or greater, in voltage associated with a first element (e.g., the capacitor 361 and/or the driving amplifier included in the modulator 360) for providing a supply voltage, at a plurality of first times, while at least one modulator (e.g., the modulator 360) provides the supply voltage to the power amplifier according to the second mode (e.g., the ET mode) in operation 611. As described above, the electronic device 101 may continuously monitor the voltage level and may determine whether a change by a threshold magnitude or greater occurs. The threshold magnitude may be determined as a level at which the electrical noise at the speaker and/or receiver is reproducible to an audible level, but is not limited thereto. When the plurality of first times are identified, the electronic device 101 may identify the time interval between consecutive times. For example, referring to FIG. 6C, the electronic device 101 may identify that changes in voltage, by the threshold magnitude or greater, occurs at t1, t2, and t3. The electronic device 101 may identify that the time interval between t1 and t2 is Δt3 and that the time interval between t2 and t3 also is Δt3.

According to various embodiment, in operation 613, the electronic device 101 may identify a plurality of second times corresponding to each of physical channels set by the network. For example, the electronic device 101 may identify an allocated time for each physical channel through radio resource control (RRC) signaling by the network. In one example, the electronic device 101 may receive an RRC message including an information element (IE) of SchedulingRequestConfig from the network. For example, the electronic device 101 may identify the transmission time (or transmission period) of the PUCCH physical channel based on SchedulingRequestConfig. In one example, the electronic device 101 may receive an RRC message including an IE of SRS config info from the network. For example, the electronic device 101 may identify the transmission time (or transmission period) of the SRS physical channel based on SRS config info. Alternatively, the electronic device 101 may identify the transmission time (or transmission period) for each physical channel commonly applied to a specific cell from the system information (e.g., SIB1). Meanwhile, the above-described configuration for determining the transmission time (or transmission period) for each physical channel set by the network is merely exemplary, and the identification method is not limited. The electronic device 101 may identify the interval between allocation times for each physical channel or identify the transmission period for each physical channel. For example, as shown in FIG. 6C, the electronic device 101 may identify that times t4 and t5 (e.g., symbols corresponding to the times) are allocated by the network, for the PUCCH. The electronic device 101 may identify that the time interval between t4 and t5 is Δt4. Alternatively, the electronic device 101 may identify that the period set by the network for the PUCCH is Δt4. For example, the electronic device 101 may identify that times t6 and t7 (e.g., symbols corresponding to the times) are allocated by the network for the SRS. The electronic device 101 may identify that the time interval between t6 and t7 is Δt3. Alternatively, the electronic device 101 may identify that the period set by the network for the SRS is Δt3. Although not shown, the electronic device 101 may identify the time interval (or period) for PUSCH or PRACH as well. Meanwhile, the time interval for each physical channel that is set exclusively for the user equipment (UE) by RRC signaling has been described above as an example. In another example, the electronic device 101 may identify information about the period for each physical channel that is commonly used for the serving cell, based on system information (e.g., SIB-1) from the serving cell. Meanwhile, identifying the change by the threshold magnitude or greater as in operation 611 and identifying the plurality of second times as in operation 613 in the shown order are merely an example, and it will be appreciated by one of ordinary skill in the art that the order of operations 611 and 613 is not limited thereto.

According to various embodiment, in operation 615, the electronic device 101 may determine whether the first time interval between at least some of the plurality of first times corresponds to the second time interval between at least some of the plurality of second times. When the first time interval corresponds to the second time interval (Yes in 615), the electronic device 101 may control at least one modulator 360 to provide the power amplifier 330 with a supply voltage set according to the first mode (e.g., the APT mode) to amplify the RF signal of the physical channel corresponding to at least some of the plurality of second times in operation 617. When the first time interval does not correspond to the second time interval (No in 615), the electronic device 101 may control the at least one modulator 360 to keep on providing the supply voltage according to the second mode (e.g., the ET mode) in operation 619. For example, referring to FIG. 6C, the second time interval Δt4 corresponding to the PUCCH may be different from the time interval Δt3 corresponding to the changes in voltage by the threshold magnitude or greater. Meanwhile, the first time interval Δt3 corresponding to the SRS may be equal to the time interval Δt3 corresponding to the changes in voltage, by the threshold magnitude or greater. In this example, the electronic device 101 may determine that the time interval (or period) between the times allocated to the SRS corresponds to the time interval between the times when the voltage changes. On the other hand, the electronic device 101 may determine that the time interval (or period) between times allocated to the PUCCH does not correspond to the time interval between the times when the voltage changes. Here, whether they correspond to each other may mean whether they match each other, while taking into account a predetermined tolerances, but is not limited thereto. The electronic device 101 may control the at least one modulator 360 to operate in the first mode (e.g., APT mode) for the SRS. For example, the electronic device 101 may control the at least one modulator 360 to operate in the first mode (e.g., APT mode) for slots including the SRS transmission time. In this case, the electronic device 101 may control the at least one modulator 360 to maintain the operation in the second mode (e.g., the ET mode) for slots other than the slots including the SRS transmission time. The electronic device 101 may control the modulator 360 to operate in the second mode (e.g., the ET mode) for the slots including the SRS transmission time based on, e.g., termination of an event (e.g., a proximity event) described below. Alternatively, according to implementation, the electronic device 101 may be implemented to operate in the first mode (e.g., APT mode) for all slots until the event (e.g., proximity event) ends. For example, the electronic device 101 may control the at least one modulator 360 to maintain the operation in the second mode (e.g., the ET mode) for the PUCCH. If there is a slot where PUCCH and SRS both are allocated, the electronic device 101 may control the at least one modulator 360 to operate in the first mode (e.g., APT mode) for the slot.

Meanwhile, in the above-described embodiment, the modulator 360 operates in the second mode (e.g., ET mode), and the modulator 360 operates in the first mode (e.g., the APT mode) for physical channels meeting a specific condition. In another embodiment, if a physical channel meeting a specific condition is identified while the modulator 360 operates in the first mode (e.g., the APT mode), the modulator 360 may be controlled to operate in a third mode (e.g., the direct mode as shown in FIG. 4A). Alternatively, according to implementation, the modulator 360 may be implemented to operate in the second mode (e.g., ET mode) and operate in the third mode (e.g., the direct mode as shown in FIG. 4A) for a physical channel meeting a specific condition.

Figure 7:
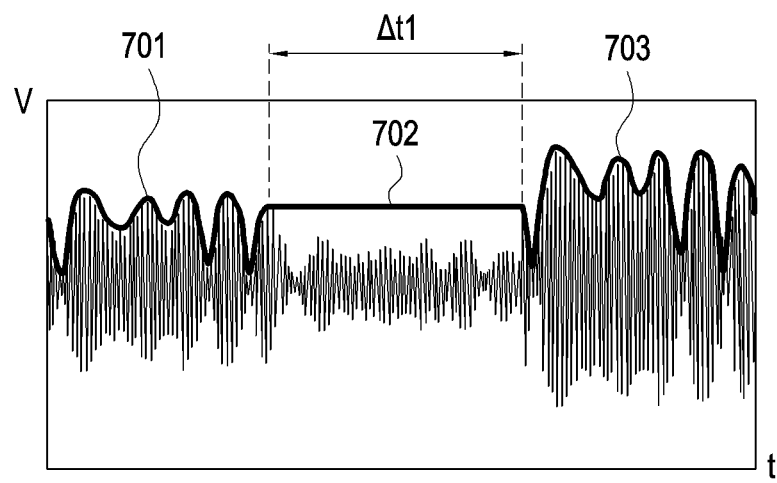
FIG. 7 illustrates a waveform of a driving voltage Vcc provided to a power amplifier by an electronic device according to various embodiment.

FIG. 7 illustrates a waveform of a driving voltage Vcc provided to a power amplifier by an electronic device according to various embodiment.

According to various embodiment, the electronic device 101 may identify that the variation in voltage associated with an element (e.g., the capacitor 361 and/or the driving amplifier included in the modulator 360) for providing the supply voltage is not less than a threshold magnitude or the voltage associated with the element exceeds a designated first threshold voltage or less than a second threshold voltage while operating in the second mode (e.g., the ET mode). Alternatively, the electronic device 101 may identify that the time interval (or period) between times allocated to a specific physical channel corresponds to the time interval between times when a change in voltage, by the threshold magnitude or greater, is identified while operating in the second mode (e.g., the ET mode). Accordingly, the electronic device 101 may switch the operation mode of the modulator 360 from the second mode (e.g., the ET mode) to the first mode (e.g., the APT mode). Referring to FIG. 7, the electronic device 101 may set the APT mode for the units of time (e.g., slot (or subframe)) Δt1 including the time when the variation in voltage associated with the element (e.g., the capacitor 361 and/or the driving amplifier included in the modulator 360) for providing the supply voltage is not less than the threshold magnitude or the voltage associated with the element exceeds the first threshold voltage or is less than the second threshold voltage. Alternatively, the electronic device 101 may set the APT mode for the units of time (e.g., slot (or subframe)) Δt1 including the transmission time of the specific physical channel. Accordingly, during the units of time (e.g., slot (or subframe)) Δt1 of the APT mode, a predetermined level of supply voltage 702 may be provided to the power amplifier 330, and the chances of current noise occurrence may be reduced. Meanwhile, although it is shown that the ET mode may be maintained in other time sections 701 and 703, this is exemplary, and it may be implemented to set the APT mode for the corresponding time sections 701 and 703 as well. In this case, based on the termination of a specific event (e.g., proximity event), the electronic device 101 may operate in the ET mode again.

Figure 8:
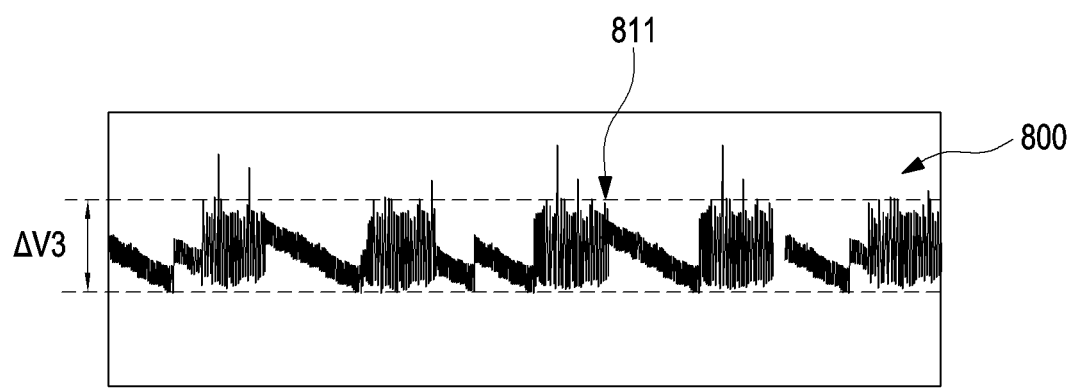
FIG. 8 is a waveform of a voltage generated (or measured) in an electronic device according to various embodiment.

FIG. 8 is a waveform of a voltage generated (or measured) in an electronic device according to various embodiment.

In the embodiment of FIG. 8, it is assumed that the modulator 360 operates in the APT mode. FIG. 8 illustrates a voltage 800 associated with a first element (e.g., the capacitor 361 and/or the driving amplifier included in the modulator 360) for providing a supply voltage Vcc. For example, the electronic device 101 may transmit an SRS at the time indicated by 811. Meanwhile, at the time indicated by 811, a drop in voltage 800 of ΔV3 may occur. The drop ΔV3 in the voltage 800 may be smaller than ΔV1 or ΔV1' of FIG. 6, and accordingly, electrical noise may thus be suppressed, as compared to FIG. 6.

Figure 9:
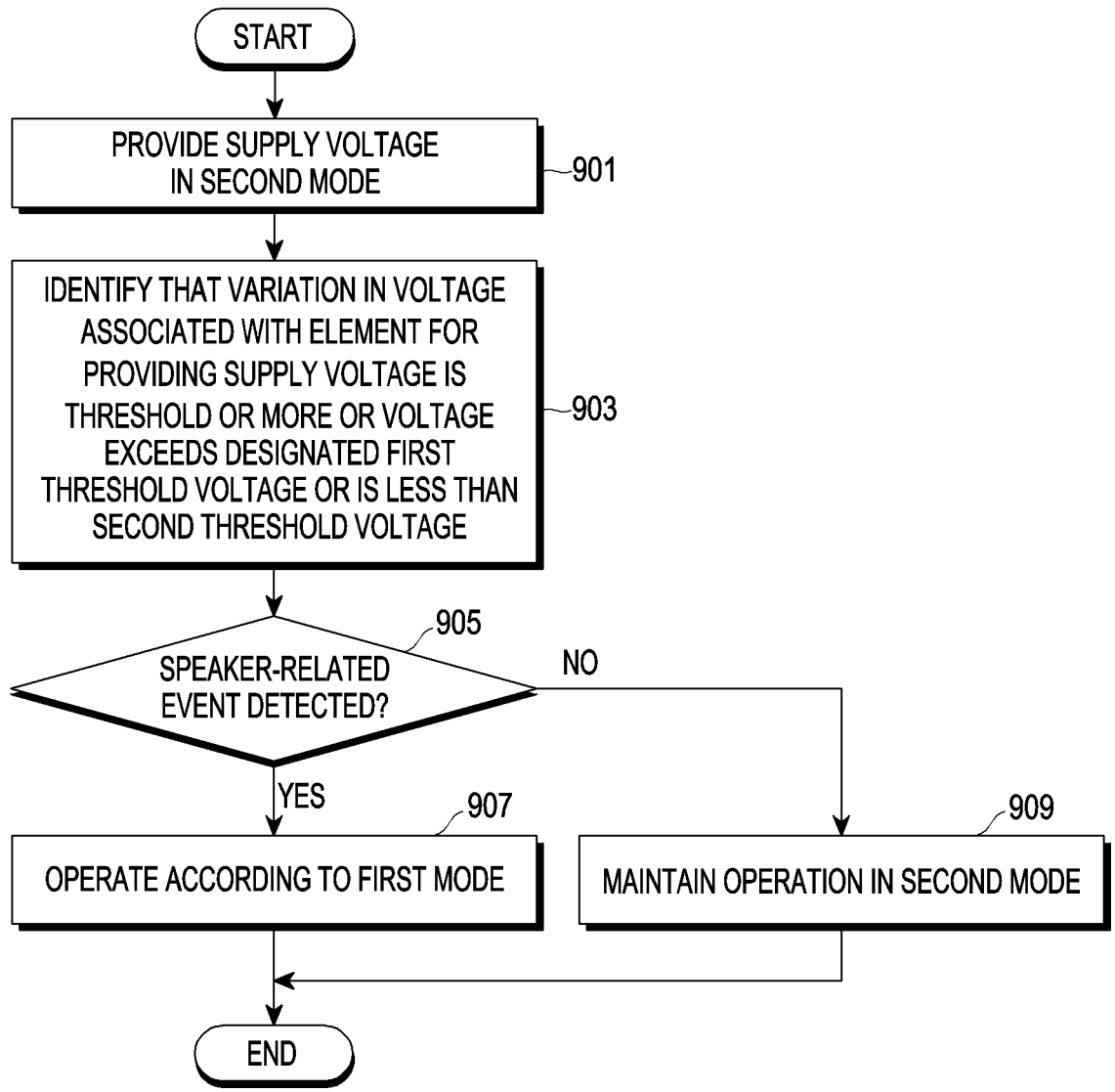
FIG. 9 is a flowchart illustrating an operation method of an electronic device according to various embodiment.

FIG. 9 is a flowchart illustrating an operation method of an electronic device according to various embodiment.

According to various embodiment, the electronic device 101 (e.g., at least one of the processor 120, the first communication processor 212, the second communication processor 214, the integrated communication processor 260, or the communication processor 310) may control the modulator 360 to provide a supply voltage to the power amplifier 330 according to the second mode (e.g., the ET mode) in operation 901. In operation 903, the electronic device 101 may identify that the variation in voltage associated with an element (e.g., the capacitor 361 and/or the driving amplifier included in the modulator 360) for providing the supply voltage is not less than a threshold magnitude or the voltage associated with the element exceeds a designated first threshold voltage or less than a second threshold voltage while the modulator 360 provides the supply voltage to the power amplifier 330 according to the second mode (e.g., the ET mode).

According to various embodiment, in operation 905, the electronic device 101 may determine whether a speaker-related event is detected. Here, the speaker-related event may be an event associated with a speaker (or a receiver) where electrical noise may occur due to the relatively rapid charge and discharge at the capacitor 361. In one example, the event may be detection of proximity by a proximity sensor disposed corresponding to the position of the speaker (or receiver). The communication processor 310 may receive information indicating the proximity, e.g., directly (or through the processor 120) from the proximity sensor and determine the reception of information as the occurrence of the event. In one example, the event may be the performance of a VoIP service (e.g., VoLTE, VoNR, or VoWi-Fi). In one example, the event may be execution of an application of sound output. The communication processor 310 may receive information indicating the execution of the application of sound output from, e.g., the processor 120, and determine the reception of information as the occurrence of the event. In one example, the event may be the acquisition of information indicative of a speaker and/or an operation of the speaker. Meanwhile, it will be appreciated by one of ordinary skill in the art that any condition capable of determining that sound is output through the speaker (or receiver) is used as an event without being limited to a specific one.

According to various embodiment, if the speaker-related event is detected (Yes in 905), the electronic device 101 may control at least one modulator 360 to provide the supply voltage, set according to the first mode (e.g., the APT mode), to the power amplifier 330 in operation 907. The electronic device 101 may identify whether the speaker-related event terminates after switching the operation mode of the modulator 360. Before the speaker-related event terminates, the modulator 360 may operate according to the first mode (e.g., the APT mode). If the speaker-related event terminates, the electronic device 101 may control the modulator 360 to operate again in the second mode (e.g., the ET mode). When the speaker-related event is not detected (No in 905), the electronic device 101 may control the at least one modulator 360 to keep on providing the supply voltage according to the second mode (e.g., the ET mode) in operation 909. For example, when no sound is output through the speaker (or receiver), electrical noise is not output either, so that the electronic device 101 may maintain the operation in the second mode (e.g., the ET mode).

Figure 10:
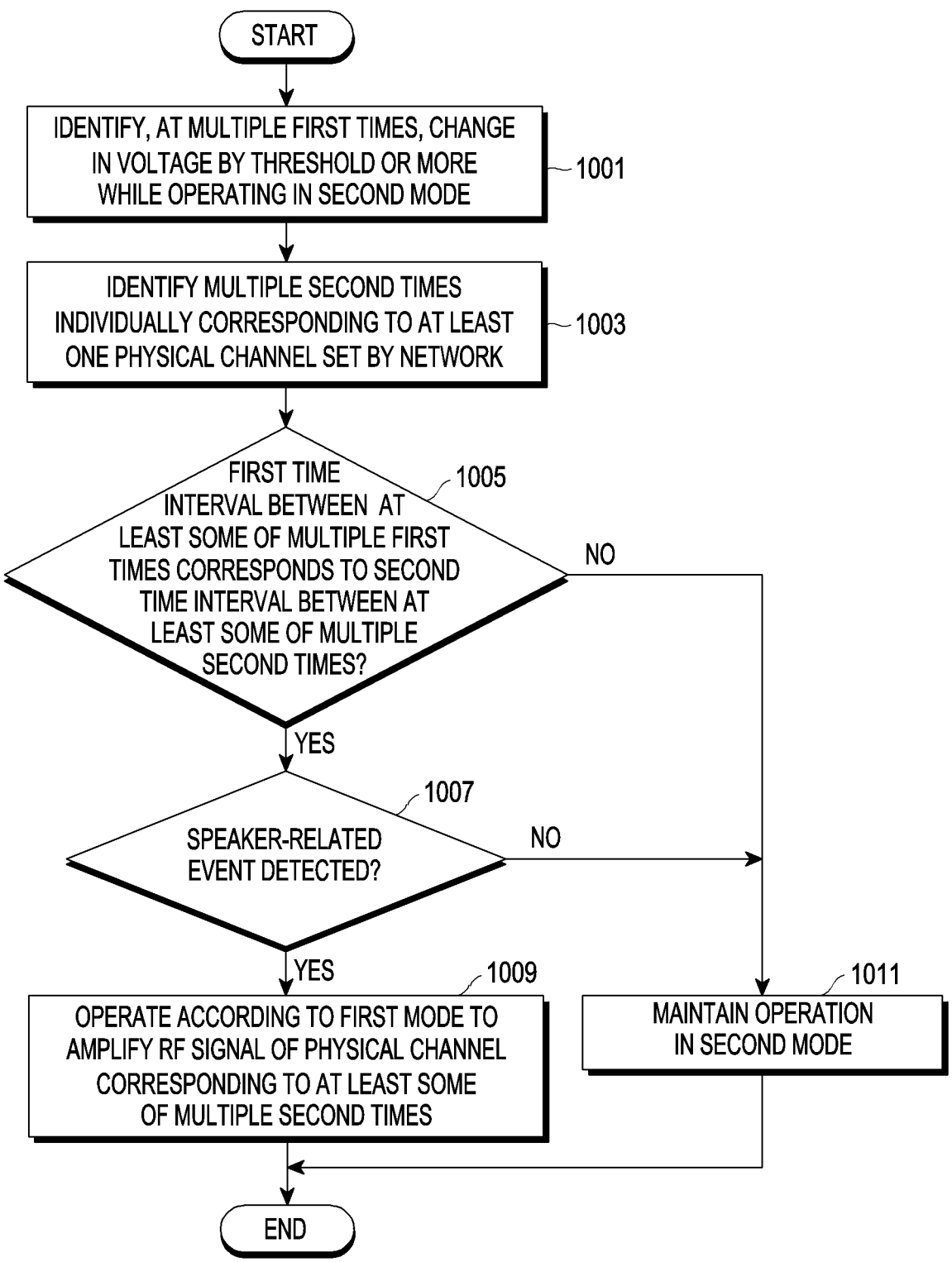
FIG. 10 is a flowchart illustrating an operation method of an electronic device according to various embodiment.

FIG. 10 is a flowchart illustrating an operation method of an electronic device according to various embodiment.

According to various embodiment, the electronic device 101 (e.g., at least one of the processor 120, the first communication processor 212, the second communication processor 214, the integrated communication processor 260, or the communication processor 310) may identify a change, by a threshold magnitude or greater, in voltage associated with a first element (e.g., the capacitor 361 and/or the driving amplifier included in the modulator 360) for providing a supply voltage, at a plurality of first times, while operating in the second mode (e.g., the ET mode) in operation 1001. As described above, the electronic device 101 may continuously monitor the voltage level and may determine whether a change by a threshold magnitude or greater occurs. Alternatively, the electronic device 101 may continuously monitor the voltage level and may determine whether a voltage that exceeds a first threshold voltage or is less than a second threshold voltage occurs. For example, the electronic device 101 may identify an occurrence of voltage change at the plurality of first times. In operation 1003, the electronic device 101 may identify a plurality of second times corresponding to each of at least one physical channel set by the network. In operation 1005, the electronic device 101 may determine whether a first time interval between at least some of the plurality of first times corresponds to a second time interval between at least some of the plurality of second times.

According to various embodiment, when the first time interval corresponds to the second time interval (Yes in 1005), the electronic device 101 may determine whether a speaker-related event is detected in operation 1007. Here, the speaker-related event may be the same as that described with reference to FIG. 9. If the speaker-related event is detected (Yes in 1007), the electronic device 101 may control at least one modulator 360 to provide the power amplifier 330 with a supply voltage set according to the first mode (e.g., the APT mode) to amplify the RF signal of the physical channel corresponding to at least some of the plurality of second times in operation 1009. When the first time interval does not correspond to the second time interval (No in 1005) or no speaker-related event is detected (No in 1007), the electronic device 101 may control the at least one modulator 360 to keep on providing the supply voltage according to the second mode (e.g., the ET mode) in operation 1011. For example, when no sound is output through the speaker (or receiver), electrical noise is not output through the speaker (or receiver) either, so that the electronic device 101 may maintain the operation in the second mode (e.g., the ET mode).

Figure 11:
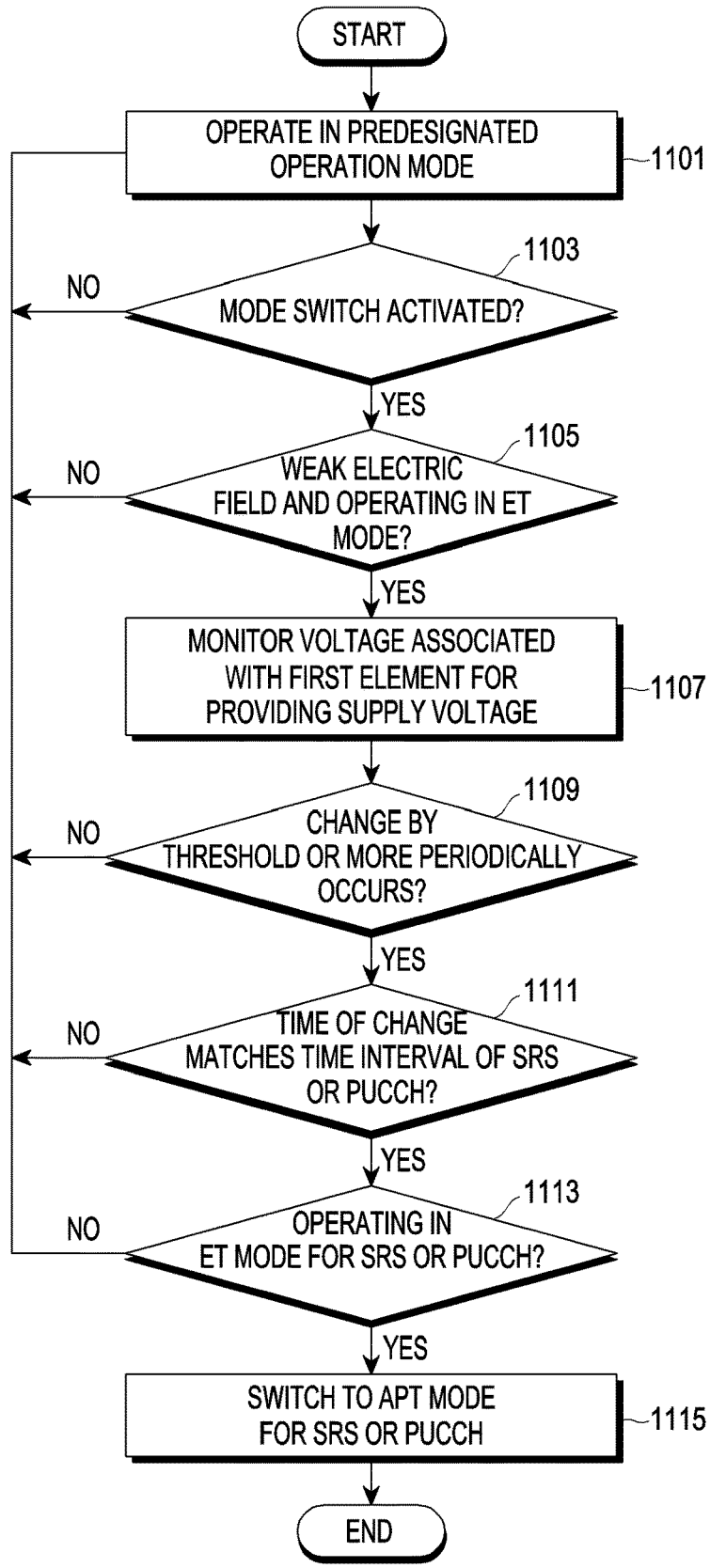
FIG. 11 is a flowchart illustrating an operation method of an electronic device according to various embodiment.

FIG. 11 is a flowchart illustrating an operation method of an electronic device according to various embodiment.

According to various embodiment, an electronic device 101 (e.g., at least one of the processor 120, the first communication processor 212, the second communication processor 214, the integrated communication processor 260, or the communication processor 310) may operate in a predesignated operation mode in operation 1101. For example, the electronic device 101 may set the second mode (e.g., the ET mode) to the predesignated mode, but the predesignated mode is not limited. In operation 1103, the electronic device 101 may determine whether a mode switch is activated. If the mode switch is not activated (No in 1103), the electronic device 101 may maintain the operation in the predesignated operation mode in operation 1101. When the mode switch is activated (Yes in 1103), in operation 1105, the electronic device 101 may determine whether the current state of the electronic device is in a weak electric field and it is operating in the ET mode. The electronic device 101 may determine whether the current state is in a weak electric field based on whether the measured Reference Signal Received Power (RSRP) is −100 dBm or less, but is not limited thereto. Meanwhile, in some cases, the electronic device 101 may operate in the APT mode even though the current state is in a weak electric field, and accordingly, the electronic device 101 may be configured to identify whether the current operation mode is the ET mode.

According to various embodiment, in operation 1107, the electronic device 101 may monitor the voltage associated with a first element (e.g., the capacitor 361 and/or the driving amplifier included in the modulator 360) for providing a supply voltage. In operation 1109, the electronic device 101 may determine whether a change by a threshold magnitude or greater periodically occurs. In one example, the electronic device 101 may determine whether a change by the threshold magnitude or greater periodically occurs, based on the number of periodic changes by the threshold magnitude or greater during a predesignated period (e.g., 500 ms or 1 s) being not less than a designated threshold number. Meanwhile, the method for determining whether periodic changes occur is not limited. If no periodic change by the threshold magnitude or greater is determined to occur (No in 1105), the electronic device 101 may maintain the operation in the predesignated operation mode in operation 1101.

According to various embodiment, if it is determined that periodic changes by the threshold magnitude or greater occur (Yes in 1105), the electronic device 101 may determine whether the time of voltage change matches the time interval of SRS or PUCCH in operation 1111. In one example, the electronic device 101 may determine whether the voltage change period is substantially identical to the period of SRS or PUCCH. If it is determined that the voltage change time does not match the time interval of SRS or PUCCH (No in 1111), the electronic device 101 may maintain the operation in the predesignated operation mode in operation 1101. If it is determined that the voltage change time matches the time interval of SRS or PUCCH (Yes in 1111), the electronic device 101 may determine whether it is operating in the ET mode for the matching physical channel of SRS or PUCCH in operation 1113. If it is operating in the APT mode for the matching physical channel of SRS or PUCCH (No in 1113), the electronic device 101 may maintain the operation in the predesignated operation mode in operation 1101. Alternatively, the electronic device 101 may switch the operation mode from the APT mode to the direct mode or maintain the operation in the APT mode. If it is operating in the ET mode for the matching physical channel of SRS or PUCCH (Yes in 1113), the electronic device 101 may switch the operation mode to the APT mode for the matching physical channel of SRS or PUCCH in operation 1115.

Meanwhile, the operation method of the electronic device 101 may be configured by, e.g., the EFS (Electronic Filing System) or NV (Non Volatile). The EFS may be a file system of the operating system used in the electronic device 101. Setting parameters in file form, following the format of a file system, may be stored. The electronic device 101 may perform the above-described operation method if it is determined that the condition set in the file is met. For example, the detailed RF-related parameters may be stored in a non-volatile memory and be referenced when the electronic device 101 operates. One of such file structures may be the NV. The NV may exist as one file of the EFS file system. The NV may include various band-related parameters and RF calibration data. The parameters for applying the above-described operations may include activation, deactivation, and forced activation, as parameters indicating whether it is activated. The above-described operations may be performed in the activated state. In the forced activated state, the electronic device 101 may immediately switch the operation mode from the ET mode to the APT mode. The parameters for applying the above-described operations may include RAT type. For example, if it is identified with the parameters that the operation method is applied only for NR, the electronic device 101 may perform the above-described operation method in the operation of NR. The parameters for applying the above-described operations may include band type. For example, the electronic device 101 may perform the above-described operation method for the band identified based on the parameters. The parameters for applying the above-described operations may include duplexing type. For example, if it is identified with the parameters that the operation method is applied only for TDD, the electronic device 101 may perform the above-described operation method in the operation of TDD. Meanwhile, as described above in connection with FIG. 6A, rather than switching the operation mode of the modulator 360 for a specific physical channel, the operation mode of the modulator 360 may be set to be switched not to cause an abrupt variation in the voltage associated with the element for providing a supply voltage.

Figure 12:
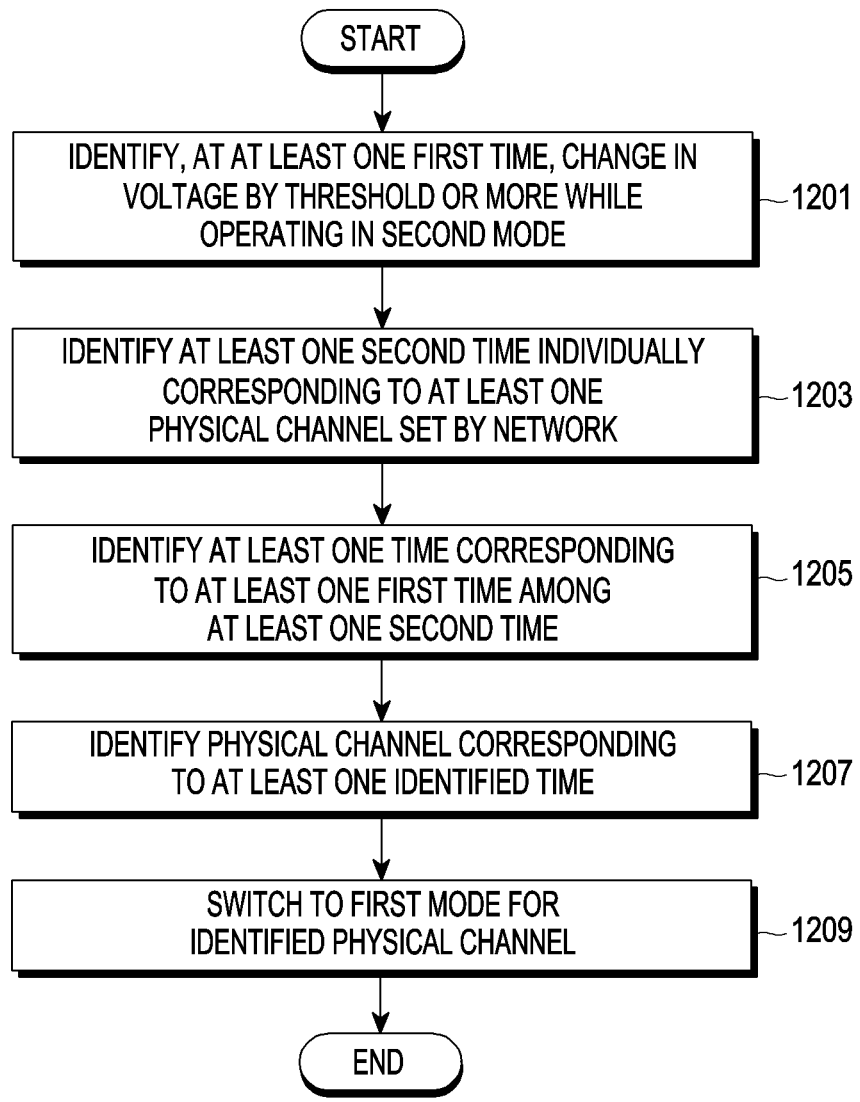
FIG. 12 is a flowchart illustrating an operation method of an electronic device according to various embodiment.

FIG. 12 is a flowchart illustrating an operation method of an electronic device according to various embodiment.

According to various embodiment, the electronic device 101 (e.g., at least one of the processor 120, the first communication processor 212, the second communication processor 214, the integrated communication processor 260, or the communication processor 310) may identify a change in voltage, by the threshold magnitude or greater, at at least one first time while operating in the second mode (e.g., the ET mode) in operation 1201. Alternatively, the electronic device 101 may identify that the voltage exceeds a first threshold or is less than a second threshold at at least one first time. In operation 1203, the electronic device 101 may identify at least one second time corresponding to each of at least one physical channel set by the network. For example, the electronic device 101 may identify at least one second time based on the resource and/or period for each physical channel allocated by the network. Meanwhile, identifying the change by the threshold magnitude or greater as in operation 1201 and identifying at least one second time as in operation 1203 in that order are merely an example, and it will be appreciated by one of ordinary skill in the art that the order of operations 1201 and 1203 is not limited thereto.

According to various embodiment, in operation 1205, the electronic device 101 may identify at least one time corresponding to at least one first time among the at least one second time. For example, the electronic device 101 may determine whether there is a time when the change by the threshold magnitude or greater is made, falls within a designated offset from the at least one second time. Here, the offset may be set considering the time interval between the charge and/or discharge of the capacitor and the actual RF radiation time, for example. In operation 1207, the electronic device 101 may identify the physical channel corresponding to at least one time identified. In operation 1209, the electronic device 101 may switch the operation mode to the first mode (e.g., the APT mode) for the identified physical channel. As described above, the electronic device 101 may switch the operation mode according to comparison between the time of voltage switch and the time of allocation of physical channel, as well as comparison between the time intervals of a plurality of times or periods.

According to various embodiment, an electronic device (e.g., the electronic device 101) may comprise at least one communication processor (e.g., the communication processor 310) configured to output at least one baseband signal associated with each of at least one physical channel, an RFIC configured to output at least one RF signal generated based on the at least one baseband signal, a power amplifier (e.g., the power amplifier 330) configured to amplify and output the at least one RF signal, and at least one modulator (e.g., the modulator 360) configured to provide the power amplifier with a supply voltage set for a first unit of time in a first mode or provide the power amplifier with the supply voltage set in a second unit of time shorter than the first unit of time in a second mode. The at least one communication processor may be configured to control the at least one modulator to provide the supply voltage to the power amplifier according to the second mode and control the at least one modulator to switch from the second mode to the first mode when a variation in a voltage associated with a first element for providing the supply voltage is greater than or equal to a threshold magnitude or the voltage associated with the first element exceeds a first threshold voltage or is less than a second threshold voltage while the supply voltage is provided to the power amplifier according to the second mode.

According to various embodiment, the at least one communication processor may be further configured to identify a plurality of first times when the variation in the voltage associated with the first element is greater than or equal to the threshold magnitude or the voltage associated with the first element exceeds the first threshold voltage or is less than the second threshold voltage while the supply voltage is provided to the power amplifier according to the second mode.

According to various embodiment, the at least one communication processor may be configured to, as at least part of the controlling of the at least one modulator to switch from the second mode to the first mode, identify a plurality of second times corresponding to each of the at least one physical channel set by a network, and control the at least one modulator to provide the power amplifier with the supply voltage set according to the first mode to amplify an RF signal of a physical channel corresponding to at least some of the plurality of second times, based on a first time interval between at least some of the plurality of first times corresponding to a second time interval between the at least some of the plurality of second times.

According to various embodiment, the at least one communication processor may be further configured to control the at least one modulator to keep on providing the supply voltage according to the second mode, based on absence of a time interval corresponding to the first time intervals among time intervals between the plurality of second times.

According to various embodiment, the at least one communication processor may be configured to, as at least part of the identifying of the plurality of second times corresponding to each of the at least one physical channel set by the network, identify the plurality of second times corresponding to each of the at least one physical channel, based on an RRC message and/or system information received from the network.

According to various embodiment, the at least one communication processor may be further configured to identify time intervals of each of the at least one physical channel, based on a period set for the at least one physical channel included in the RRC message and/or the system information.

According to various embodiment, the at least one communication processor may be configured to, as at least part of the identifying of the plurality of second times corresponding to each of the at least one physical channel, based on the RRC message and/or the system information received from the network, identify at least one of at least one of symbol, subframe, or slot corresponding to each of the at least one physical channel and/or a period set for the at least one physical channel included in the RRC message and/or the system information.

According to various embodiment, the communication processor may be configured to, as at least part of the controlling of the at least one modulator to provide the power amplifier with the supply voltage set according to the first mode to amplify the RF signal of the physical channel corresponding to the at least some of the plurality of second times, based on the first time interval between the at least some of the plurality of first times corresponding to the second time interval between the at least some of the plurality of second times, control the at least one modulator to provide the power amplifier with the supply voltage set according to the first mode for a first time section including the physical channel corresponding to the at least some of the plurality of second times.

According to various embodiment, the communication processor may be configured to, as at least part of the controlling of the at least one modulator to provide the power amplifier with the supply voltage set according to the first mode to amplify the RF signal of the physical channel corresponding to the at least some of the plurality of second times, based on the first time interval between the at least some of the plurality of first times corresponding to the second time interval between the at least some of the plurality of second times, control the at least one modulator to provide the power amplifier with the supply voltage set according to either the first mode or the second mode during a second time section other than the first time section including the physical channel corresponding to the at least some of the plurality of second times.

According to various embodiment, the communication processor may be configured to, as at least part of the controlling of the at least one modulator to provide the power amplifier with the supply voltage set according to the first mode to amplify the RF signal of the physical channel corresponding to the at least some of the plurality of second times, based on the first time interval between the at least some of the plurality of first times corresponding to the second time interval between the at least some of the plurality of second times, identify a period of occurrence in which the voltage is changed by the threshold magnitude or greater and control the at least one modulator to provide the power amplifier with the supply voltage set according to the first mode to amplify the RF signal of the physical channel corresponding to the at least some of the plurality of second times, when the period of occurrence corresponds to the second time interval.

According to various embodiment, the at least one communication processor may be configured to, as at least part of the controlling of the at least one modulator to switch from the second mode to the first mode and provide the supply voltage, control the at least one modulator to switch from the second mode to the first mode and provide the supply voltage, based on identifying occurrence of a specific event.

According to various embodiment, the at least one communication processor may be further configured to control the at least one modulator to switch from the first mode to the second mode and provide the supply voltage, based on identifying termination of the specific event.

According to various embodiment, the specific event may include at least one of execution of VoIP, a proximity event identified based on a proximity sensor, a sound output from at least one speaker included in the electronic device, or execution of a sound output application.

According to various embodiment, the second mode may be an ET mode, and the first mode may be an APT mode.

According to various embodiment, the at least one communication processor may be configured to identify, at at least one first time, that a variation in a voltage associated with a first element for providing the supply voltage is greater than or equal to a threshold magnitude or the voltage associated with the first element exceeds a first threshold voltage or is less than a second threshold voltage while the supply voltage is provided to the power amplifier according to the second mode, identify at least one second time corresponding to each of the at least one physical channel set by a network, control the at least one modulator to provide the power amplifier with the supply voltage set according to the first mode to amplify an RF signal of a physical channel corresponding to at least one of the at least one second time, based on at least one of the at least one first time corresponding to the at least one of the at least one second time, and control the at least one modulator to keep on providing the supply voltage according to the second mode, based on absence of a time interval corresponding to the first time intervals among time intervals between the plurality of second times.

According to various embodiment, a method for operating an electronic device including at least one communication processor configured to output at least one baseband signal associated with each of at least one physical channel, an RFIC configured to output at least one RF signal generated based on the at least one baseband signal, a power amplifier configured to amplify and output the at least one RF signal, and at least one modulator configured to provide the power amplifier with a supply voltage set for a first unit of time in a first mode or provide the power amplifier with the supply voltage set in a second unit of time shorter than the first unit of time in a second mode may comprise controlling, by the at least one communication processor, the at least one modulator to provide the supply voltage to the power amplifier according to the second mode and controlling, by the at least one communication processor, the at least one modulator to switch from the second mode to the first mode when a variation in a voltage associated with a first element for providing the supply voltage is greater than or equal to a threshold magnitude or the voltage associated with the first element exceeds a first threshold voltage or is less than a second threshold voltage while the supply voltage is provided to the power amplifier according to the second mode.

According to various embodiment, the method may further comprise identifying, by the at least one communication processor, a plurality of first times when the variation in the voltage associated with the first element is greater than or equal to the threshold magnitude or the voltage associated with the first element exceeds the first threshold voltage or is less than the second threshold voltage while the supply voltage is provided to the power amplifier according to the second mode.

According to various embodiment, controlling the at least one modulator to switch from the second mode to the first mode may include identifying, by the at least one communication processor, a plurality of second times corresponding to each of the at least one physical channel set by a network and controlling the at least one modulator to provide the power amplifier with the supply voltage set according to the first mode to amplify an RF signal of a physical channel corresponding to at least some of the plurality of second times, based on a first time interval between at least some of the plurality of first times corresponding to a second time interval between the at least some of the plurality of second times.

According to various embodiment, the method may further comprise controlling, by the at least one communication processor, the at least one modulator to keep on providing the supply voltage according to the second mode, based on absence of a time interval corresponding to the first time intervals among time intervals between the plurality of second times.

According to various embodiment, identifying the plurality of second times corresponding to each of the at least one physical channel set by the network may include identifying, by the at least one communication processor, the plurality of second times corresponding to each of the at least one physical channel, based on the RRC message and/or the system information received from the network.

The electronic device according to various embodiments of the disclosure may be one of various types of electronic devices. The electronic devices may include, for example, a portable communication device (e.g., a smart phone), a computer device, a portable multimedia device, a portable medical device, a camera, a wearable device, or a home appliance. According to various embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to various embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to various embodiment, a method according to various embodiments of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. Some of the plurality of entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Certain of the above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein.

While the present disclosure has been shown and described with reference to various embodiments thereof, it will be understood by those skilled in the art that various changes in form and details may be made therein without departing from the present disclosure as defined by the appended claims and their equivalents.

What is claimed is:

1. An electronic device comprising:
    at least one communication processor configured to output at least one baseband signal associated with each of at least one physical channel;
    a radio frequency integrated circuit (RFIC) configured to output at least one radio frequency (RF) signal generated based on the at least one baseband signal;
    a power amplifier configured to amplify and output the at least one RF signal; and
    at least one modulator configured to provide the power amplifier with a supply voltage set for a first unit of time in a first mode or provide the power amplifier with the supply voltage set in a second unit of time shorter than the first unit of time in a second mode,
    wherein the at least one communication processor is configured to:
        control the at least one modulator to provide the supply voltage to the power amplifier according to the second mode, and
        control the at least one modulator to switch from the second mode to the first mode when a variation in a voltage associated with a first element for providing the supply voltage is greater than or equal to a threshold magnitude, or the voltage associated with the first element exceeds a first threshold voltage or is less than a second threshold voltage while the supply voltage is provided to the power amplifier according to the second mode.

2. The electronic device of claim 1, wherein the at least one communication processor is further configured to identify a plurality of first times when the variation in the voltage associated with the first element is greater than or equal to the threshold magnitude or the voltage associated with the first element exceeds the first threshold voltage or is less than the second threshold voltage while the supply voltage is provided to the power amplifier according to the second mode.

3. The electronic device of claim 2, wherein the at least one communication processor is configured to, as at least part of the controlling of the at least one modulator to switch from the second mode to the first mode:
identify a plurality of second times corresponding to each of the at least one physical channel set by a network, and
control the at least one modulator to provide the power amplifier with the supply voltage set according to the first mode to amplify an RF signal of a physical channel corresponding to at least some of the plurality of second times, based on a first time interval between at least some of the plurality of first times corresponding to a second time interval between the at least some of the plurality of second times.

4. The electronic device of claim 3, wherein the at least one communication processor is further configured to control the at least one modulator to keep on providing the supply voltage according to the second mode, based on absence of a time interval corresponding to the first time intervals among time intervals between the plurality of second times.

5. The electronic device of claim 3, wherein the at least one communication processor is configured to, as at least part of the identifying of the plurality of second times corresponding to each of the at least one physical channel set by the network:
identify the plurality of second times corresponding to each of the at least one physical channel, based on a radio resource control (RRC) message and/or system information received from the network.

6. The electronic device of claim 5, wherein the at least one communication processor is further configured to identify time intervals of each of the at least one physical channel, based on a period set for the at least one physical channel included in the RRC message and/or the system information.

7. The electronic device of claim 5, wherein the at least one communication processor is configured to, as at least part of the identifying of the plurality of second times corresponding to each of the at least one physical channel, based on the RRC message and/or the system information received from the network:
identify at least one of symbol, subframe, or slot corresponding to each of the at least one physical channel, and/or a period set for the at least one physical channel included in the RRC message and/or the system information.

8. The electronic device of claim 3, wherein the at least one communication processor is configured to, as at least part of the controlling of the at least one modulator to provide the power amplifier with the supply voltage set according to the first mode to amplify the RF signal of the physical channel corresponding to the at least some of the plurality of second times, based on the first time interval between the at least some of the plurality of first times corresponding to the second time interval between the at least some of the plurality of second times:
control the at least one modulator to provide the power amplifier with the supply voltage set according to the first mode for a first time section including the physical channel corresponding to the at least some of the plurality of second times.

9. The electronic device of claim 8, wherein the at least one communication processor is configured to, as at least part of the controlling of the at least one modulator to provide the power amplifier with the supply voltage set according to the first mode to amplify the RF signal of the physical channel corresponding to the at least some of the plurality of second times, based on the first time interval between the at least some of the plurality of first times corresponding to the second time interval between the at least some of the plurality of second times:
control the at least one modulator to provide the power amplifier with the supply voltage set according to either the first mode or the second mode during a second time section other than the first time section including the physical channel corresponding to the at least some of the plurality of second times.

10. The electronic device of claim 3, wherein the at least one communication processor is configured to, as at least part of the controlling of the at least one modulator to provide the power amplifier with the supply voltage set according to the first mode to amplify the RF signal of the physical channel corresponding to the at least some of the plurality of second times, based on the first time interval between the at least some of the plurality of first times corresponding to the second time interval between the at least some of the plurality of second times:
identify a period of occurrence in which the voltage is changed by the threshold magnitude or greater, and
control the at least one modulator to provide the power amplifier with the supply voltage set according to the first mode to amplify the RF signal of the physical channel corresponding to the at least some of the plurality of second times, when the period of occurrence corresponds to the second time interval.

11. The electronic device of claim 1, wherein the at least one communication processor is configured to, as at least part of the controlling of the at least one modulator to switch from the second mode to the first mode and provide the supply voltage:
control the at least one modulator to switch from the second mode to the first mode and provide the supply voltage, based on identifying occurrence of a specific event.

12. The electronic device of claim 11, wherein the at least one communication processor is further configured to control the at least one modulator to switch from the first mode to the second mode and provide the supply voltage, based on identifying termination of the specific event.

13. The electronic device of claim 11, wherein the specific event includes at least one of execution of Voice over Internet Protocol (VoIP), a proximity event identified based on a proximity sensor, a sound output from at least one speaker included in the electronic device, or execution of a sound output application.

14. The electronic device of claim 1, wherein the second mode is an envelope tracking (ET) mode, and the first mode is an average power tracking (APT) mode.

15. A method for operating an electronic device including at least one communication processor configured to output at least one baseband signal associated with each of at least one physical channel, a radio frequency integrated circuit (RFIC) configured to output at least one radio frequency (RF) signal generated based on the at least one baseband signal, a power amplifier configured to amplify and output the at least one RF signal, and at least one modulator configured to provide the power amplifier with a supply voltage set for a first unit of time in a first mode or provide the power amplifier with the supply voltage set in a second unit of time shorter than the first unit of time in a second mode, the method comprising:

controlling, by the at least one communication processor, the at least one modulator to provide the supply voltage to the power amplifier according to the second mode; and controlling, by the at least one communication processor, the at least one modulator to switch from the second mode to the first mode when a variation in a voltage associated with a first element for providing the supply voltage is greater than or equal to a threshold magnitude, or the voltage associated with the first element exceeds a first threshold voltage or is less than a second threshold voltage while the supply voltage is provided to the power amplifier according to the second mode.

16. The method of claim 15, further comprising identifying, by the at least one communication processor, a plurality of first times when the variation in the voltage associated with the first element is greater than or equal to the threshold magnitude or the voltage associated with the first element exceeds the first threshold voltage or is less than the second threshold voltage while the supply voltage is provided to the power amplifier according to the second mode.

17. The method of claim 16, wherein the controlling of the at least one modulator to switch from the second mode to the first mode further comprises:

identifying, by the at least one communication processor, a plurality of second times corresponding to each of the at least one physical channel set by a network, and controlling the at least one modulator to provide the power amplifier with the supply voltage set according to the first mode to amplify an RF signal of a physical channel corresponding to at least some of the plurality of second times, based on a first time interval between at least some of the plurality of first times corresponding to a second time interval between the at least some of the plurality of second times.

18. The method of claim 17, further comprising controlling, by the at least one communication processor, the at least one modulator to keep on providing the supply voltage according to the second mode, based on absence of a time interval corresponding to the first time intervals among time intervals between the plurality of second times.

19. The method of claim 17, wherein the identifying of the plurality of second times corresponding to each of the at least one physical channel set by the network further comprises:

identifying, by the at least one communication processor, the plurality of second times corresponding to each of the at least one physical channel, based on a radio resource control (RRC) message and/or system information received from the network.

20. An electronic device comprising:

at least one communication processor configured to output at least one baseband signal associated with each of at least one physical channel;

a radio frequency integrated circuit (RFIC) configured to output at least one RF signal generated based on the at least one baseband signal;

a power amplifier configured to amplify and output the at least one RF signal; and at least one modulator configured to provide the power amplifier with a supply voltage set for a first unit of time in a first mode or provide the power amplifier with the supply voltage set in a second unit of time shorter than the first unit of time in a second mode, wherein the at least one communication processor is configured to:

identify, at at least one first time, that a variation in a voltage associated with a first element for providing the supply voltage is greater than or equal to a threshold magnitude, or the voltage associated with the first element exceeds a first threshold voltage or is less than a second threshold voltage while the supply voltage is provided to the power amplifier according to the second mode, identify at least one second time corresponding to each of the at least one physical channel set by a network, control the at least one modulator to provide the power amplifier with the supply voltage set according to the first mode to amplify an RF signal of a physical channel corresponding to at least one of the at least one second time, based on at least one of the at least one first time corresponding to the at least one of the at least one second time, and control the at least one modulator to keep on providing the supply voltage according to the second mode, based on absence of a time interval corresponding to the first time intervals among time intervals between the plurality of second times.

* * * * *